(12) United States Patent
Hibino

(10) Patent No.: US 10,659,285 B2
(45) Date of Patent: May 19, 2020

(54) MANAGEMENT APPARATUS AND INFORMATION PROCESSING SYSTEM

(71) Applicant: FUJITSU LIMITED, Kawasaki-shi, Kanagawa (JP)

(72) Inventor: Tetsuya Hibino, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 316 days.

(21) Appl. No.: 15/688,927

(22) Filed: Aug. 29, 2017

(65) Prior Publication Data

US 2018/0091357 A1 Mar. 29, 2018

(30) Foreign Application Priority Data

Sep. 29, 2016 (JP) ................................. 2016-191806

(51) Int. Cl.
*H04L 12/24* (2006.01)
*G06F 11/07* (2006.01)
*H04L 29/08* (2006.01)

(52) U.S. Cl.
CPC ...... *H04L 41/0213* (2013.01); *G06F 11/0709* (2013.01); *G06F 11/0727* (2013.01); *G06F 11/0775* (2013.01); *H04L 41/046* (2013.01); *H04L 41/06* (2013.01); *H04L 41/0893* (2013.01); *H04L 67/1097* (2013.01)

(58) Field of Classification Search
CPC ....... G06F 11/0709–0748; G06F 3/067; H04L 67/1008–1097; H04L 63/1416–1433; H04L 63/0263–08; H04L 41/0213–0631; H04L 41/5035; H04L 43/08; H04L 65/1063; G06Q 40/00–06; G06Q 10/10–1097; H04Q 2213/13505
See application file for complete search history.

(56) References Cited

U.S. PATENT DOCUMENTS

| | | | |
|---|---|---|---|
| 2003/0135439 A1* | 7/2003 | Yagishita | G06Q 10/10 705/36 R |
| 2004/0049572 A1* | 3/2004 | Yamamoto | G06F 16/10 709/224 |
| 2006/0245724 A1* | 11/2006 | Hwang | H04N 5/76 386/241 |
| 2007/0055715 A1* | 3/2007 | Achiwa | G06F 16/119 |

(Continued)

FOREIGN PATENT DOCUMENTS

| | | |
|---|---|---|
| JP | 2004-133897 | 4/2004 |
| JP | 2007-172003 | 7/2007 |
| JP | 2007-257645 | 10/2007 |

*Primary Examiner* — Hitesh Patel
(74) *Attorney, Agent, or Firm* — Fujitsu Patent Center

(57) ABSTRACT

A storage unit stores management information indicating statuses of components related to an information processing apparatus. Upon receiving a notification of a state change of the information processing apparatus, a processing unit determines whether to query for component information indicating current statuses of the components in response to the notification. When a determination is made to query for component information, the processing unit selects one or more query target components from the plurality of components, acquires the component information of the selected query target components, and updates the management information stored in the storage unit, based on the component information.

5 Claims, 21 Drawing Sheets

(56) References Cited

U.S. PATENT DOCUMENTS

2007/0143398 A1\* 6/2007 Graham ................ G06Q 40/02
                                                                           709/204
2007/0174721 A1   7/2007 Yamamoto et al.
2008/0155386 A1\* 6/2008 Jensen ................. G06F 9/5083
                                                                           715/201
2013/0282998 A1\* 10/2013 Tatsumi .............. G06F 11/1456
                                                                           711/162

\* cited by examiner

| Management Table (Port of Storage Apparatus) ||
| --- | --- |
| Item Name | Content |
| port_no | Port Number |
| storage_serial_no | Serial Number of Apparatus |
| ca_no | Channel Adapter Number To Which Port Belongs |
| cm_no | Controller Module Number To Which Port Belongs |
| port_name | Port Name |
| port_type | Port Type |
| port_status | Detailed Status of Port |
| link_status | Link Status of Port |

FIG. 7

| Connection Table | 112 |
|---|---|
| Item Name | Content |
| server_fc_hba_wwn | WWN of HBA of Business Server |
| server_name | Business Server Name |
| server_side_switch_port_no | Port Number of Business-Server-Side Switch |
| server_side_switch_name | Switch Name Managed by Business Server |
| storage_fc_port_wwn | WWN of Fibre Channel Port of Storage Apparatus |
| storage_port_name | Fibre Channel Port Name of Storage Apparatus |
| storage_serial_no | Serial Number of Storage Apparatus |
| storage_side_switch_port_no | Port Number of Storage-Apparatus-Side Switch |
| storage_side_switch_name | Switch Name Managed by Storage Apparatus |

FIG. 8

| Connection Status | | 113 |
| --- | --- | --- |
| Item Name | Content | |
| server_id | Business Server ID | |
| server_fc_hba_wwn | WWN of HBA of Business Server | |
| storage_fc_port_wwn | WWN of Fibre Channel Port of Storage Apparatus | |
| access_path_status | Access Path Status | |
| ap_status_reason | Error Cause | |

FIG. 9

| Trap Type List ||
|---|---|
| Specific Trap Type | Content |
| 2 | Notification of Failure or Degradation of Component |
| 3 | Notification of Battery Expiration |
| 5 | Notification of Event That Needs Preventive Maintenance |
| 6 | Notification of Temperature Error |
| 7 | Notification of Event That Needs Maintenance and Preventive Maintenance |
| 9 | Notification of Completion of Deletion of RAID Group by Automated Storage Tiering |
| 10 | Notification of Link Status of Channel Adapter Port |
| 14 | Notification of Error in Automated Storage Tiering |
| 22 | Notification of Alarm Cancellation for TRAP #2 |
| 25 | Notification of Alarm Cancellation for TRAP #5 |
| 26 | Notification of Alarm Cancellation for TRAP #6 |

FIG. 10

MANAGEMENT APPARATUS AND INFORMATION PROCESSING SYSTEM

CROSS-REFERENCE TO RELATED APPLICATION

This application is based upon and claims the benefit of priority of the prior Japanese Patent Application No. 2016-191806, filed on Sep. 29, 2016, the entire contents of which are incorporated herein by reference.

FIELD

The embodiments discussed herein are related to a management apparatus and an information processing system.

BACKGROUND

In recent information processing systems, a plurality of types of apparatuses (for example, storage apparatus, switch, server computer, and so on) are connected to a network and operated. As the system scale increases, the number of apparatuses operated also increases, which makes operational management burdensome. Thus, a management apparatus that supports operational management of such an information processing system is used.

For example, there has been proposed a network manager that is connected to a storage network including a storage system, a server, and a switch. The network manager includes event dictionaries corresponding to products of multiple vendors, and uses the event dictionaries to interpret an event message received from a device experiencing a failure.

There has also been proposed a storage area network (SAN) manager that interprets a failure notification message received from each apparatus on a SAN. The SAN manager detects the influence of a failure on a real volume or a virtual volume.

There has been also proposed a management server that receives information transmitted from an agent in each host computer and a property information notification unit in each hardware apparatus. The management server centrally manages pieces of information transmitted from a plurality of apparatuses by associating the pieces of information with each other in a unique data structure.

See, for example, Japanese Laid-open Patent Publications No. 2004-133897, No. 2007-172003, and No. 2007-257645.

An information processing apparatus includes a plurality of components such as a processing device, a storage device, a communication interface, and so on. The states of these components may change in response to a failure or the like. One method to deal with this may be to cause a management apparatus to periodically collect information on all the components existing in a system, and register and centrally manage the collected information as management information. However, in normal time or the like, for example, there may be no difference between information to be collected and the previously collected information. That is, the management apparatus might perform unneeded information collection.

Another method may be, for example, to cause a management apparatus to notify the system administrator of occurrence of an error, and collect information on all the components in response to an input of a collection instruction from the administrator. However, with this method, although information collection is performed only on limited occasions, a determination of whether to collect information is made by the administrator. Therefore, management information is not updated unless the administrator issues an instruction, which might reduce the accuracy of management information.

SUMMARY

According to one aspect of the embodiments, there is provided a management apparatus including: a memory configured to store management information indicating statuses of components related to an information processing apparatus; and a processor configured to perform a procedure including: upon receiving a notification of a state change of the information processing apparatus, determining whether to query for component information indicating current statuses of the components in response to the notification, when a determination is made to query for component information, selecting one or more query target components from the plurality of components, acquiring the component information of the selected query target components, and updating the management information stored in the memory, based on the component information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates examples of management tables according to the second embodiment;

FIG. 8 illustrates an example of a connection table according to the second embodiment;

FIG. 9 illustrates an example of a connection status according to the second embodiment;

FIG. 10 illustrates a trap type list according to the second embodiment;

DESCRIPTION OF EMBODIMENTS

Figure 1:
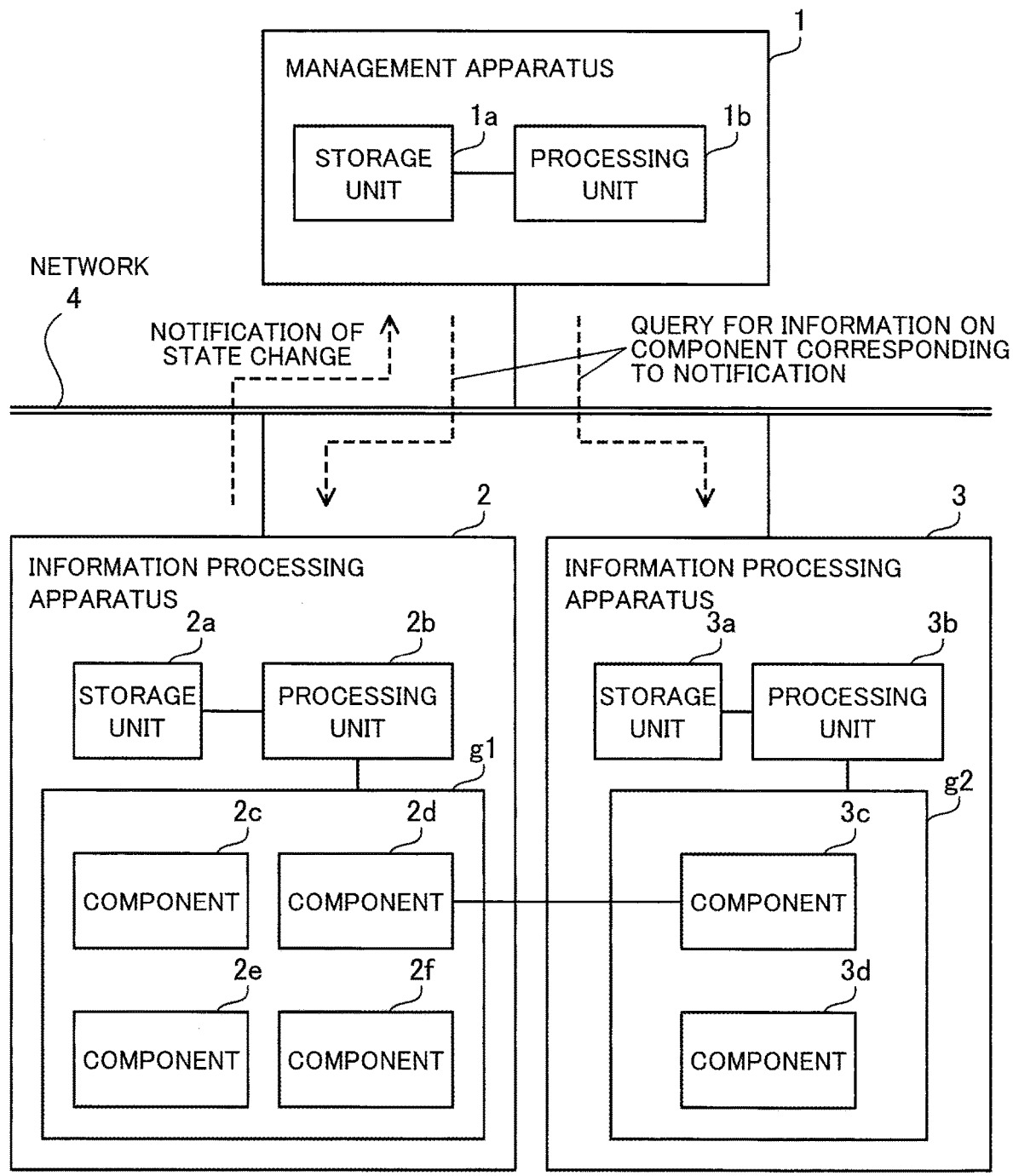
FIG. 1 illustrates a management apparatus according to a first embodiment.

Several embodiments will be described below with reference to the accompanying drawings, wherein like reference numerals refer to like elements throughout.

(a) First Embodiment

FIG. 1 illustrates a management apparatus 1 according to a first embodiment. The management apparatus performs operational management of information processing apparatuses 2 and 3. The management apparatus 1 and the information processing apparatuses 2 and 3 are connected to a network 4. The information processing apparatuses 2 and 3 may be, for example, storage apparatuses, server computers, switches, or the like.

The management apparatus 1 includes a storage unit 1a and a processing unit 1b. The storage unit 1a may be a volatile storage device such as random access memory (RAM) and the like, or may be a non-volatile storage device such as hard disk drive (HDD), flash memory, and the like. The processing unit 1b may include a central processing unit (CPU), a digital signal processor (DSP), an application specific integrated circuit (ASIC), a field programmable gate array (FPGA), and the like. The processing unit 1b may be a processor that executes a program. The "processor" may be a set of processors (multiprocessor). The management apparatus 1 may be a computer including a memory (storage unit 1a) and a processor (processing unit 1b).

The information processing apparatus 2 includes a storage unit 2a, a processing unit 2b, and components 2c, 2d, 2e, and 2f. The information processing apparatus 3 includes a storage unit 3a, a processing unit 3b, and components 3c and 3d. Similar to the storage unit 1a, each of the storage units 2a and 3a may be RAM or HDD. Similar to the processing unit 1b, each of the processing units 2b and 3b may be a processor such as CPU and the like. A component group g1 is a set of components including the components 2c, 2d, 2e, and 2f. A component group g2 is a set of components including the components 3c and 3d.

The components 2c, 2d, 2e, and 2f are hardware that implements predetermined functions of the information processing apparatus 2, and may be, for example, a processing device, a storage device, a communication interface, and the like. For example, the components 2c, 2d, 2e, and 2f are connected to the processing unit 2b via an internal bus of the information processing apparatus 2. Similarly, the components 3c and 3d are hardware that implements predetermined functions of the information processing apparatus 3. For example, the components 3c and 3d are connected to the processing unit 3b via an internal bus of the information processing apparatus 3. In the example of FIG. 1, the components 2d and 3c are communication interfaces that establish a communication path between the information processing apparatuses 2 and 3. The components 2d and 3c are connected with a predetermined cable. The components 2c, 2e, and 2f may be software modules executed by the information processing apparatus 2. Similarly, the component 3d may be a software module executed by the information processing apparatus 3.

The storage unit 1a stores management information including information on the status of each of the components 2c, 2d, 2e, 2f, 3c, and 3d. The components 2c, 2d, 2e, and 2f are included in the information processing apparatus 2, and therefore are components related to the information processing apparatus 2. The components 3c and 3d are included in the information processing apparatus 3 connected to the information processing apparatus 2 with a cable, and therefore are components related to the information processing apparatus 2. For example, there may be a case where the information processing apparatus 3 is a relay apparatus such as switch and the like that relays communication of the information processing apparatus 2, and another information processing apparatus (not illustrated in FIG. 1) that communicates with the information processing apparatus 2 is connected to the relay apparatus. In this case, the components included in the other information processing apparatus may be considered as components related to the information processing apparatus 2.

The processing unit 1b manages the statuses of the components 2c, 2d, 2e, 2f, 3c, and 3d, in addition to the statuses of the information processing apparatuses 2 and 3. The processing unit 1b stores management information on the components 2c, 2d, 2e, 2f, 3c, and 3d in the storage unit 1a.

The status of the information processing apparatus 2 may include the following states: the information processing apparatus 2 is in a normal state (normal state); the information processing apparatus 2 is experiencing an error (error state); the information processing apparatus 2 has recovered from a failure (recovery from a failure); maintenance work on the information processing apparatus 2 has completed (maintenance completion); and so on. The same applies to the information processing apparatus 3.

Further, the status of the component 2c may include the following states: the component 2c is in a normal state; a warning has been issued in the component 2c; the component 2c is experiencing an error; the component 2c is unable to communicate with other apparatuses; and so on. The same applies to the components 2d, 2e, 2f, 3c, and 3d.

The processing unit 1b receives a notification of a state change of the information processing apparatus from the information processing apparatus 2. Upon receiving the notification of a state change of the information processing apparatus 2, the processing unit 1b determines whether to query for component information about the components 2c, 2d, 2e, 2f, 3c, and 3d in response to the notification. Component information is information indicating the current status of each component (including information on hardware of each component). For example, if the component is an HDD, component information may include the identification name of the HDD, the total storage capacity, the used capacity, the available capacity, normal or error, access load, and so on. Further, for example, if the component is a communication interface, component information may include the identification name of the communication interface, the link status (link-up, link-down, and so on), communication load, and so on.

For example, the state changes of the information processing apparatus 2 in response to which the processing unit 1b determines to query for component information may include the following state changes. The first one is a change from the normal state to the error state. The second one is a change from the error state to the recovery from a failure. The third one is a change from the normal state to the maintenance completion. In all of these cases, the state change notified by the information processing apparatus 2 is likely to be caused by a state change of one of the components.

The state changes in response to which the processing unit 1b determines not to query for component information may include the following state changes. The first one is a change from the recovery from a failure to the normal state. The second one is a change from the maintenance completion to the normal state. In both cases, the states of the components are less likely to have been changed.

If a determination is made to query for component information, the processing unit 1b selects one or more query target components from the components 2c, 2d, 2e, 2f, 3c, and 3d, in accordance with the notification of a state change of the information processing apparatus 2.

For example, if the content of the notification indicates a failure that affects only the information processing apparatus 2 and does not affect the information processing apparatus 3, or indicates recovery from a failure, the processing unit 1b selects the components 2c, 2d, 2e, and 2f as the query targets from the components 2c, 2d, 2e, 2f, 3c, and 3d.

There may be a case where the content of the notification indicates maintenance (for example, replacing HDD, and so on) related to one or some components of the information processing apparatus 2. In this case, the processing unit 1b may select a component of interest (for example, only the component 2e), or a plurality components of the same type as a component of interest (for example, only the components 2e and 2f), as the query targets, from the components 2c, 2d, 2e, and 2f.

If the content of the notification indicates a failure or recovery from a failure that affects not only the information processing apparatus 2 but also the information processing apparatus 3, the processing unit 1b may select all the components 2c, 2d, 2e, 2f, 3c, and 3d as the query targets. In this case as well, the processing unit 1b may narrow down the query targets in accordance with the content of the notification.

For example, as for the information processing apparatus 3, the processing unit 1b may select the component 3c used for communication and cooperation with the information processing apparatus 2 as the query target from the components 3c and 3d. That is, the processing unit 1b may select the components 2c, 2d, 2e, and 3c as the query targets. Alternatively, in the case where the content of the notification indicates an error related to communication with the information processing apparatus 3, the processing unit 1b may further narrow down the query targets. In this case, for example, the processing unit 1b may narrow down the query targets by selecting the components 2d and 3c from the components 2c, 2d, 2e, 2f, 3c, and 3d.

The processing unit 1b acquires component information of the selected query target components. For example, consider the case where the components 2c, 2d, 2e, 2f, 3c, and 3d are the query target components.

In this case, the processing unit 1b requests the processing unit 2b for component information of the components 2c, 2d, 2e, and 2f. The processing unit 2b transmits the component information of the components 2c, 2d, 2e, and 2f to the processing unit 1b. The processing unit 2b may acquire the component information of the components 2c, 2d, 2e, and 2f in advance, store the component information in the storage unit 2a, read the component information from the storage unit 2a in response to a request from the processing unit 1b, and respond to the processing unit 1b. Alternatively, in the case where each of the components 2c, 2d, 2e, and 2f stores component information in its internal memory, the processing unit 2b may read the component information from each of the components 2c, 2d, 2e, and 2f in response to a request from the processing unit 1b, and respond to the processing unit 1b.

The processing unit 1b also requests the processing unit 3b for component information of the components 3c and 3d. Similar to the processing unit 2b, the processing unit 3b returns component information of the components 3c and 3d to the processing unit 1b.

The processing unit 1b updates the management information stored in the storage unit 1a, based on the acquired component information. For example, the processing unit 1b reflects the differences between the states of the components 2c, 2d, 2e, 2f, 3c and 3d registered in the management information and the states of the components 2c, 2d, 2e, 2f, 3c and 3d indicated by the component information acquired this time, in the management information.

In the manner described above, according to the management apparatus 1, the management apparatus 1 autonomously acquires component information of each component, and updates management information, in response to a notification of a state change of the information processing apparatus 2. Thus, it is possible to improve the accuracy of management information. The following describes specific methods for this.

One method may be, for example, to cause the management apparatus 1 to periodically collect information on all the components (components 2c, 2d, 2e, 2f, 3c, and 3d). However, there may be no difference between information to be collected and the previous information, and unneeded information collection might be performed. Unneeded information collection increases the communication traffic. Further, as the number of components about which information is collected increases, the communication traffic increases.

Another method may be to cause the management apparatus 1 to notify the system administrator of occurrence of an error, and collect information on all the components in response to an input of a collection instruction from the administrator. However, with this method, a determination of whether to collect information is made by the administrator. Therefore, management information is not updated unless the administrator issues an instruction, which might reduce the accuracy of management information.

In view of the above, the management apparatus 1 receives a notification of a state change of the information processing apparatus 2, and determines whether to collect information, in response to the notification. More specifically, as mentioned above, if a determination is made, based on the notification, that the states of the components are likely to have been changed, the management apparatus 1 determines to collect component information. On the other hand, if a determination is made that the states of the components are less likely to have been changed, the management apparatus 1 determines not to collect component information. This prevents unneeded information collection by the management apparatus 1. Further, the management apparatus 1 collects information at appropriate time determined by the management apparatus 1, and updates the management information. Therefore, it is possible to increase the accuracy of management information, compared to the case where the administrator determines when to collect information.

Further, the management apparatus 1 selects one or more query target components from the plurality of components included in the system, in accordance with a notification. Therefore, it is possible to prevent unneeded information collection, and prevent increase in communication traffic, compared to the case where all the components are always selected as the query target components. Thus, according to the management apparatus 1, it is possible to efficiently improve the accuracy of management information.

In the case where a state change notification is received from the information processing apparatus 3, the management apparatus 1 determines whether to collect component information, selects one or more query target components, acquires component information of the selected query target components, and updates the management information, in the same manner as described above.

In the following, the operational management function of the management apparatus 1 will be described in detail based on an example in which the management apparatus 1 is applied to an information processing system including a storage apparatus.

(b) Second Embodiment

Figure 2:
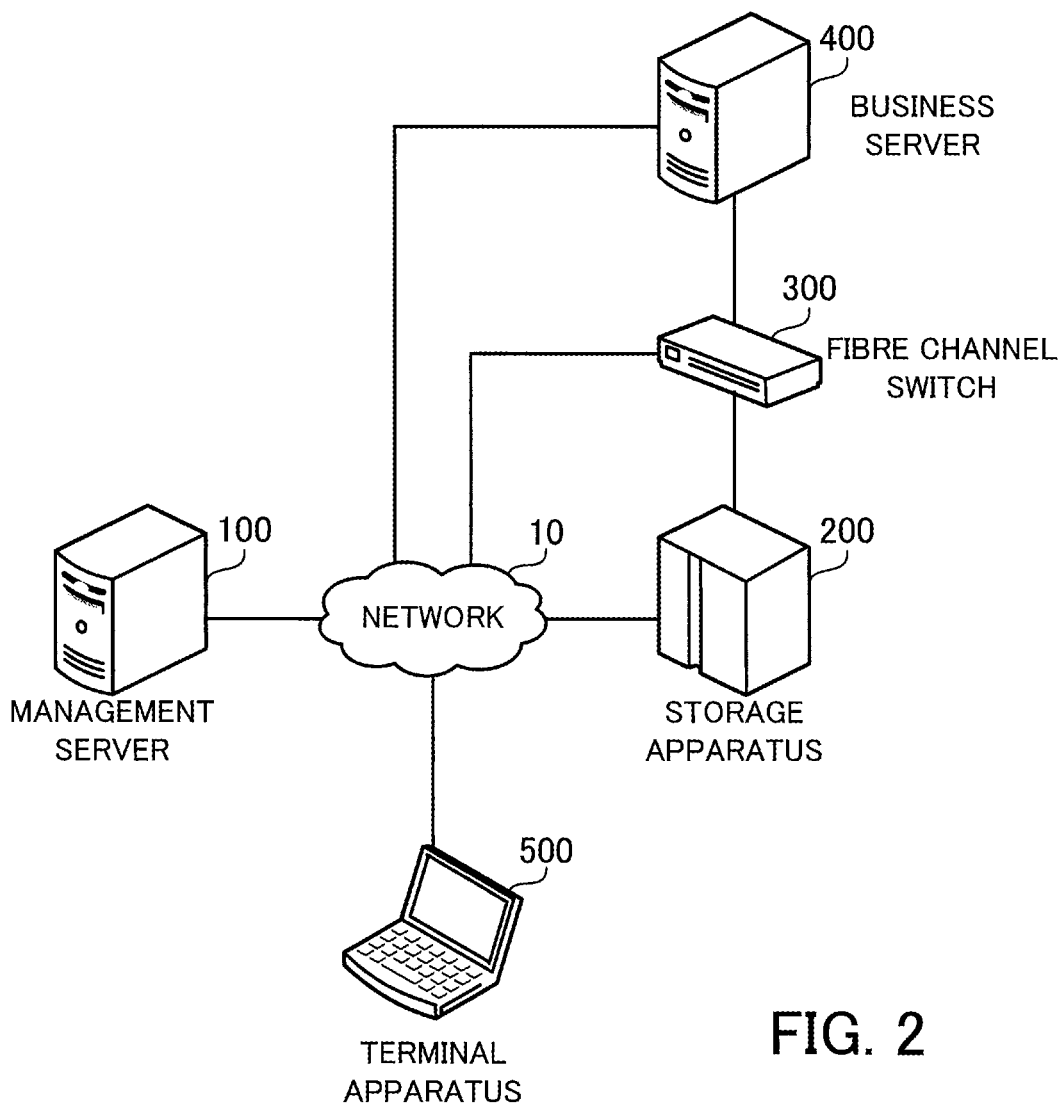
FIG. 2 illustrates an example of an information processing system according to a second embodiment.

FIG. 2 illustrates an example of an information processing system according to a second embodiment. The information processing system of the second embodiment includes a management server 100, a storage apparatus 200, a Fibre Channel switch 300, a business server 400, and a terminal apparatus 500. The management server 100, the storage apparatus 200, the Fibre Channel switch 300, the business server 400, and the terminal apparatus 500 are connected to a network 10. The network 10 is, for example, a local area network (LAN) for operational management. The storage apparatus 200 and the business server 400 are connected to the Fibre Channel switch 300.

The management server 100 is a server computer that performs operational management of the storage apparatus 200, the Fibre Channel switch 300, and the business server 400. Each of the storage apparatus 200, the Fibre Channel switch 300, and the business server 400 includes various components. The management server 100 collects information on the components from each of the storage apparatus 200, the Fibre Channel switch 300, and the business server 400, and centrally manages the information. The management server 100 serves as a Web server, and provides a management screen including the statuses of the components to the terminal apparatus 500.

The storage apparatus 200 includes a plurality of storage devices such as HDD, solid state drive (SSD), and the like. The storage apparatus 200 constructs a logical storage area using a plurality of storage devices with redundant arrays of inexpensive disks (RAID) technologies, and provides the storage area to the business server 400. The storage apparatus 200 receives an access to the storage area of the business server 400 according to the Fibre Channel protocol, via the Fibre Channel switch 300. Note that a "storage apparatus" may be referred to simply as a "storage".

The Fibre Channel switch 300 is a relay apparatus used for a fabric connection of Fibre Channel. That is, the Fibre Channel switch 300 forms a SAN, together with the storage apparatus 200 and the business server 400 connected thereto. Other than the storage apparatus 200 and the business server 400, a plurality of storage apparatuses, server computers, and other Fibre Channel switches may be connected to the Fibre Channel switch 300.

The business server 400 is a server computer that supports the business of the user. The business server 400 executes predetermined business processing. The business server 400 writes data to the storage apparatus 200, and reads data from the storage apparatus 200 for business processing.

The terminal apparatus 500 is a client computer used by the administrator who performs operational management of the information processing system. The terminal apparatus 500 serves as a Web browser, and presents to the administrator a management screen provided by the management server 100.

The management server 100 is an example of the management apparatus 1 of the first embodiment. The storage apparatus 200, the Fibre Channel switch 300, and the business server 400 are examples of the information processing apparatuses 2 and 3 of the first embodiment.

Figure 3:
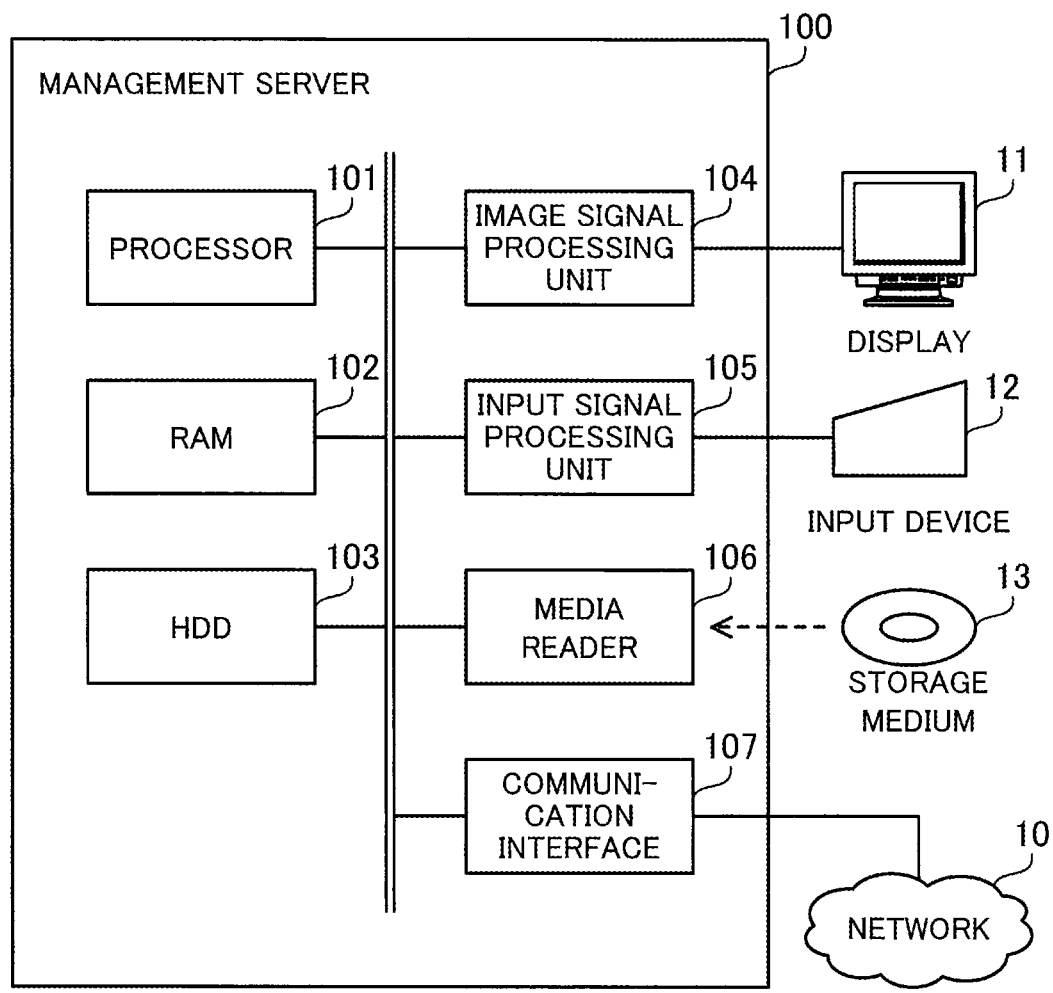
FIG. 3 illustrates an example of the hardware of a management server according to the second embodiment.

FIG. 3 illustrates an example of the hardware of the management server 100 according to the second embodiment. The management server 100 includes a processor 101, a RAM 102, an HDD 103, an image signal processing unit 104, an input signal processing unit 105, a media reader 106, and a communication interface 107. Each unit is connected to a bus of the management server 100. The business server 400 and the terminal apparatus 500 are implemented with hardware similar to that of the management server 100.

The processor 101 controls information processing performed by the management server 100. The processor 101 may be a multiprocessor. The processor 101 may be, for example, CPU, DSP, ASIC, FPGA, or the like. Alternatively, the processor 101 may be a combination of two or more of CPU, DSP, ASIC, FPGA, and the like.

The RAM 102 is a primary storage device of the management server 100. The RAM 102 temporarily stores at least part of the program of the operating system (OS) and application programs that are executed by the processor 101. The RAM 102 also stores various types of data used for processing by the processor 101.

The HDD 103 is a secondary storage device of the management server 100. The HDD 103 magnetically writes data to and reads data from an internal magnetic disk. The HDD 103 stores the program of the operating system, application programs, and various types of data. The management server 100 may include other types of secondary storage devices such as flash memory, SSD, and the like, and may include a plurality of secondary storage devices.

The image signal processing unit 104 outputs an image to a display 11 connected to the management server 100, in accordance with an instruction from the processor 101. Examples of the display 11 include cathode ray tube (CRT) display, liquid crystal display, and the like.

The input signal processing unit 105 obtains an input signal from an input device 12 connected to the management server 100, and outputs the input signal to the processor 101. Examples of the input device 12 include pointing device (such as mouse, touch panel, and so on), keyboard, and the like.

The media reader 106 is a device that reads a program and data stored in a storage medium 13. Examples of the storage medium 13 include magnetic disk (such as flexible disk (FD), HDD, and so on), optical disc (such as compact disc (CD), digital versatile disc (DVD), and so on), magneto-optical disc (MO), and the like. Examples of the storage medium 13 may also include non-volatile semiconductor memory such as flash memory card. The media reader 106 reads a program and data from the storage medium 13, and stores the read program and data in the RAM 102 or the HDD 103, in accordance with an instruction from the processor 101, for example.

The communication interface 107 is an interface that communicates with other apparatuses via the network 10. The communication interface 107 may be a wired communication interface, or may be a radio communication interface.

Note that, as mentioned above, the business server 400 connects to the Fibre Channel switch 300, in addition to the network 10. Accordingly, the business server 400 includes a communication interface for Fibre Channel called a host bus adapter (HBA) for connection to the Fibre Channel switch 300, in addition to a communication interface for connection to the network 10.

Figure 4:
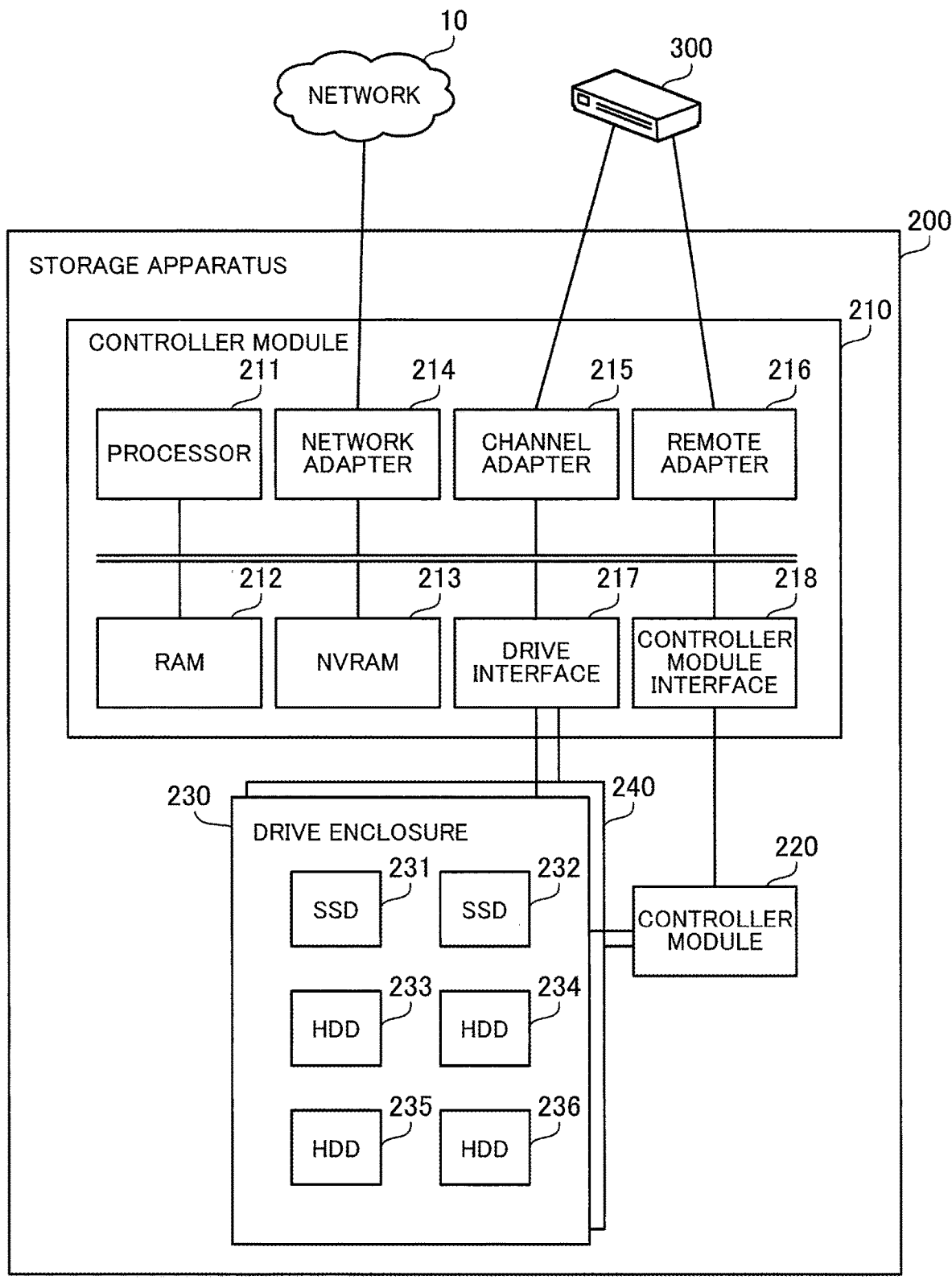
FIG. 4 illustrates an example of the hardware of a storage apparatus according to the second embodiment.

FIG. 4 illustrates an example of the hardware of the storage apparatus 200 according to the second embodiment. The storage apparatus 200 includes controller modules 210 and 220, and drive enclosures 230 and 240.

The controller modules 210 and 220 are storage control devices that control data access to the HDDs and SSDs stored in the drive enclosures 230 and 240. The drive enclosures 230 and 240 are housings for storing a plurality of HDDs and SSDs. For example, the storage apparatus 200 includes the controller modules 210 and 220 and the drive enclosures 230 and 240 to create a redundant configuration, and therefore is capable of continuing operations even when any of these units fails.

The controller module 210 includes a processor 211, a RAM 212, a non-volatile RAM (NVRAM) 213, a network adapter 214, a channel adapter 215, a remote adapter 216, a drive interface 217, and a controller module interface 218. Each unit is connected to a bus of the controller module 210. The controller module 220 may be implemented with hardware similar to that of the controller module 210.

The processor 211 controls information processing performed by the controller module 210. The processor 211 may be a multiprocessor. The processor 211 may be, for example, CPU, DSP, ASIC, FPGA, or the like. Alternatively, the processor 211 may be a combination of two or more of CPU, DSP, ASIC, FPGA, and the like.

The RAM 212 is a primary storage device of the controller module 210. The RAM 212 temporarily stores at least part of the program of the operating system (firmware) to be executed by the processor 211. The RAM 212 also stores various types of data used for processing by the processor 211.

The NVRAM 213 is a secondary storage device of the controller module 210. The NVRAM 213 is a non-volatile semiconductor memory, for example. The NVRAM 213 stores the program of the operating system (including firmware) and various types of data.

The network adapter 214 is a communication interface for communicating with the management server 100 via the network 10. For example, an interface for Ethernet (registered trademark) may be used as the network adapter 214.

The channel adapter 215 is a Fibre Channel communication interface for communicating with the business server 400 via the Fibre Channel switch 300. The channel adapter 215 is connected to the Fibre Channel switch 300 with a Fibre Channel cable. However, a communication interface (for example, Internet Small Computer System Interface (iSCSI)) other than Fibre Channel may be used for connection between the storage apparatus 200 and the business server 400.

The remote adapter 216 is a communication interface that is used for a high-speed, high-reliability remote data copy function called Remote Advanced Copy. The remote adapter 216 is connected to the Fibre Channel switch 300 with a Fibre Channel cable. For example, the storage apparatus 200 transfers a copy of data in the storage apparatus 200 to another storage apparatus (not illustrated in FIG. 2) connected to the Fibre Channel switch 300 or other Fibre Channel switches, using the remote adapter 216.

The drive interface 217 is an interface for communicating with the drive enclosures 230 and 240. For example, an interface such as Serial Attached SCSI (SAS) and the like may be used as the drive interface 217.

The controller module interface 218 is an interface for connection to the controller module 220. The controller module 210 is able to perform data access in cooperation with the controller module 220, using the controller module interface 218. For example, the controller module 210 may be an active system, and the controller module 220 may be a standby system. Alternatively, both the controller modules 210 and 220 may be active systems to perform data access in a distributed manner. In either case, if one fails, the other may take over data access, thereby preventing interruption of the business of the user.

The drive enclosure 230 includes SSDs 231 and 232 and HDDs 233, 234, 235, and 236. As with the drive enclosure 230, the drive enclosure 240 includes a plurality of SSDs and a plurality of HDDs.

Figure 5:
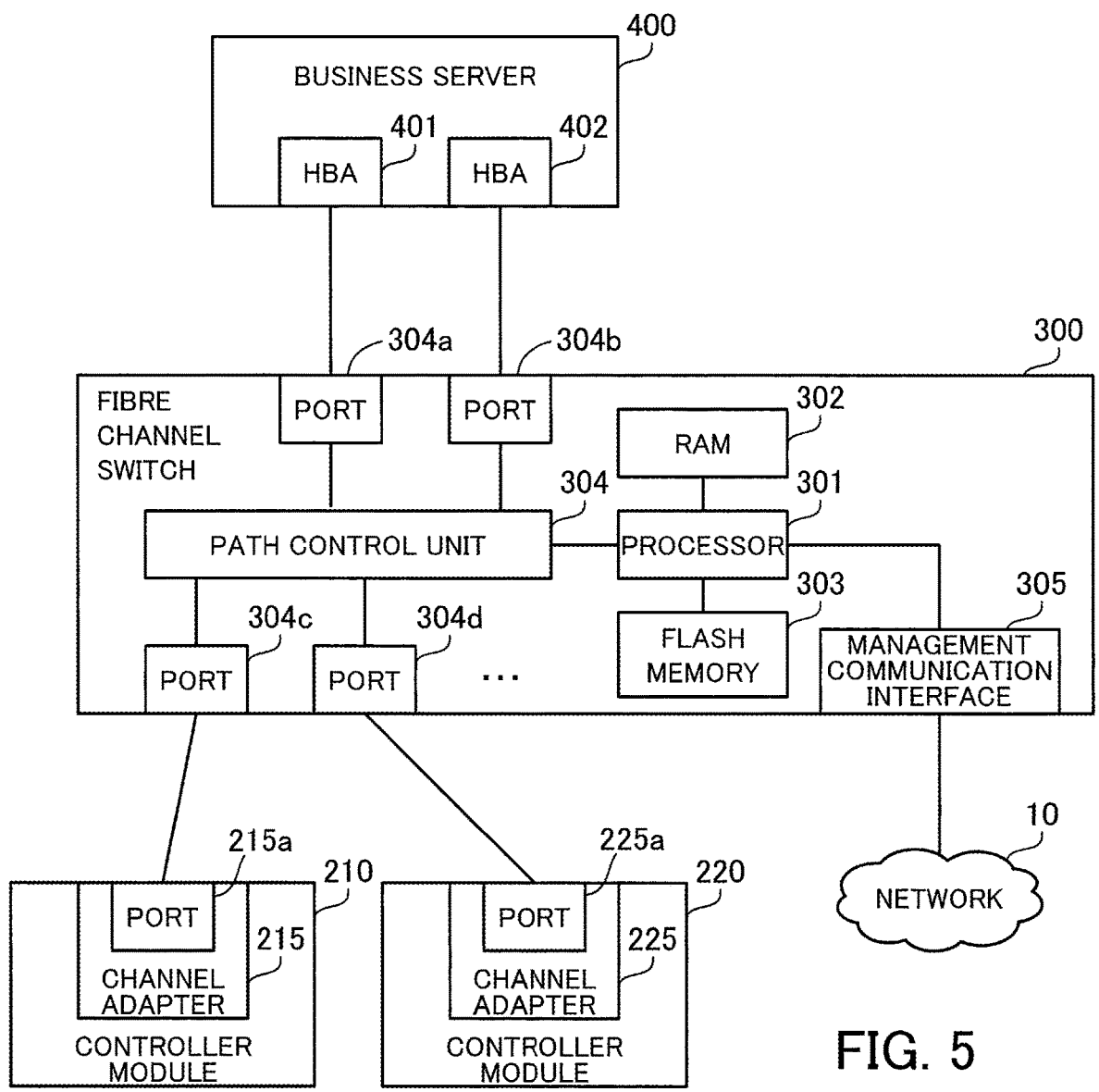
FIG. 5 illustrates an example of the hardware of a Fibre Channel switch according to the second embodiment.

FIG. 5 illustrates an example of the hardware of the Fibre Channel switch 300 according to the second embodiment. The Fibre Channel switch 300 includes a processor 301, a RAM 302, a flash memory 303, a path control unit 304, ports 304a, 304b, 304c, 304d, and so on, and a management communication interface 305.

The processor 301 controls information processing performed by the Fibre Channel switch 300. The processor 301 may be a multiprocessor. The processor 301 may be, for example, CPU, DSP, ASIC, FPGA, or the like. Alternatively, the processor 301 may be a combination of two or more of CPU, DSP, ASIC, FPGA, and the like.

The RAM 302 is a primary storage device of the Fibre Channel switch 300. The RAM 302 temporarily stores at least part of firmware programs and application programs that are executed by the processor 301. The RAM 302 also stores various types of data used for processing by the processor 301.

The flash memory 303 is a secondary storage device of the Fibre Channel switch 300. The flash memory 303 stores firmware programs, application programs, and various types of data.

The path control unit 304 establishes a communication path between the input-side port and the output-side port in accordance with an instruction from the processor 301. The path control unit 304 is implemented by a crossbar switch mechanism, for example.

The ports 304a, 304b, 304c, 304d, and so on are interfaces into which connectors at the ends of Fibre Channel cables are inserted.

The channel adapter 215 of the controller module 210 includes a port 215a. A channel adapter 225 of the controller module 220 includes a port 225a. The business server 400 includes host bus adapters 401 and 402. In the business server 400, redundancy of connection to the Fibre Channel switch 300 is provided by the two host bus adapters 401 and 402. Accordingly, even if one of the host bus adapters 401 and 402 fails, the business server 400 is able to communicate with the storage apparatus 200 via the Fibre Channel switch 300. The Fibre Channel switch 300 is connected to the storage apparatus 200 and the business server 400 with a plurality of Fibre Channel cables in the manner described below.

The port 304a is connected to the host bus adapter 401. The port 304b is connected to the host bus adapter 402. The port 304c is connected to the port 215a. The port 304d is connected to the port 225a. Although not illustrated in FIG. 5, the remote adapter (for example, the remote adapter 216) of each of the controller modules 210 and 220 is connected to one of the ports of the Fibre Channel switch 300.

The management communication interface 305 is a communication interface that communicates with the management server 100 via the network 10. For example, an Ethernet interface may be used as the management communication interface 305.

Figure 6:
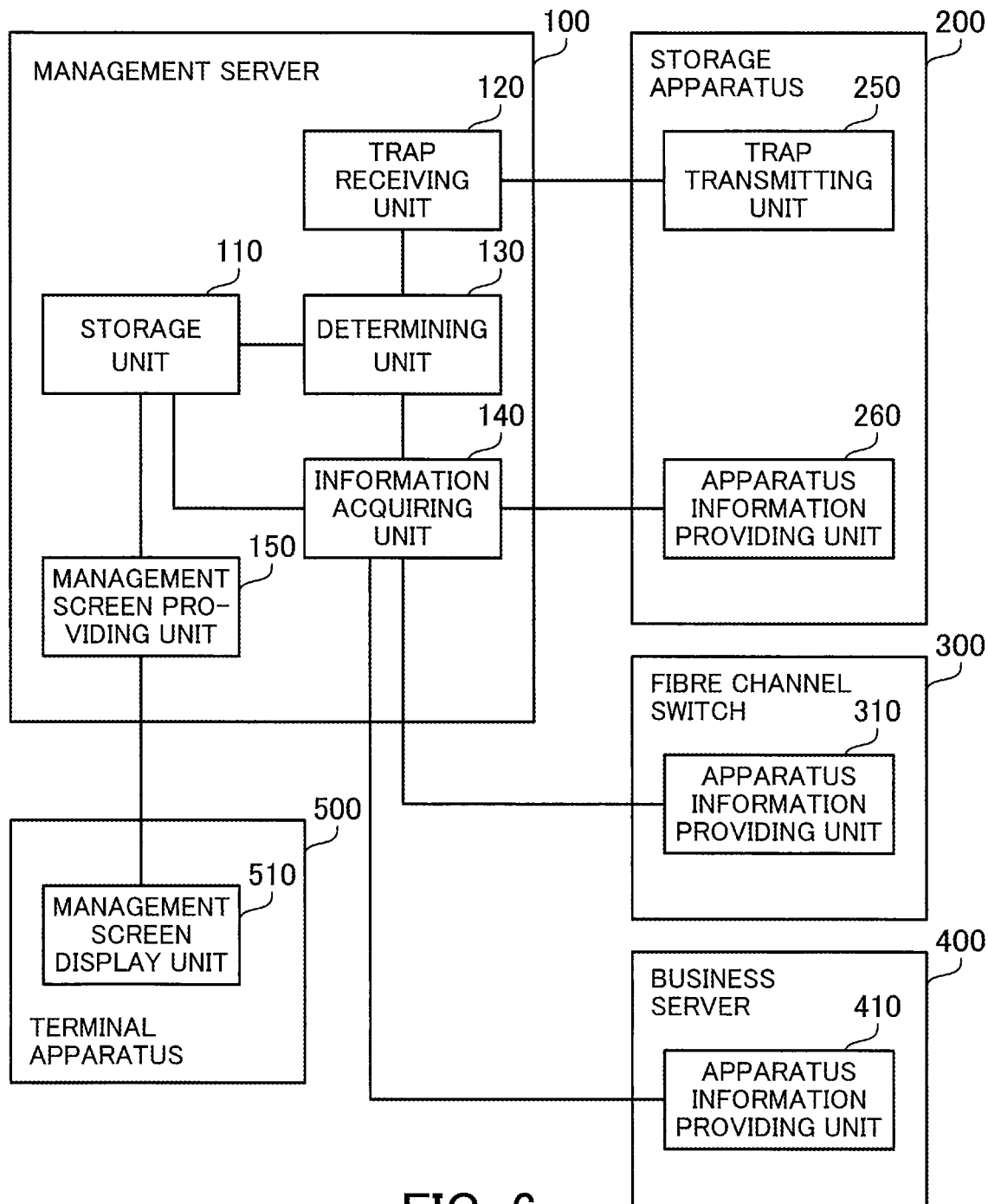
FIG. 6 illustrates an example of functions according to the second embodiment.

FIG. 6 illustrates an example of functions according to the second embodiment. The management server 100 includes a storage unit 110, a trap receiving unit 120, a determining unit 130, an information acquiring unit 140, and a management screen providing unit 150. The storage unit 110 is implemented with storage areas reserved in the RAM 102 and the HDD 103. The trap receiving unit 120, the determining unit 130, the information acquiring unit 140, and the management screen providing unit 150 are implemented by execution of a program in the RAM 102 by the processor 101.

The storage unit 110 stores management information (repository) for centrally managing information on the components included in the storage apparatus 200, the Fibre Channel switch 300, and the business server 400. The types of components vary from apparatus to apparatus.

Each component may be hardware including a plurality of hardware elements such as the controller module 210, the drive enclosure 230 (or the HDDs and SSDs in the drive enclosure 230), and the Fibre Channel switch 300. Each component may be a hardware element such as the processor 211, the channel adapter 215, the remote adapter 216, the drive interface 217, the controller module interface 218, the SSD 231, the HDD 233, the ports 304a and 304b, the host bus adapters 401 and 402, and so on. Further, each component may be, for example, driver software that controls the operation of the hardware, application software, or the like (or may be a program module that implements a predetermined function in software).

The storage unit 110 also stores information indicating the connection relationship between the storage apparatus 200, the Fibre Channel switch 300, and the business server 400. The storage unit 110 also stores information on the trap types of Simple Network Management Protocol (SNMP) traps received from the storage apparatus 200.

The trap receiving unit 120 receives an SNMP trap from the storage apparatus 200. Upon receiving the SNMP trap, the trap receiving unit 120 notifies the determining unit 130 of the content of the SNMP trap.

Upon obtaining the content of the SNMP trap, the determining unit 130 determines whether an event that needs updating of the information on components in the repository has occurred, based on the SNMP trap. If an event that needs updating of the information on components in the repository has occurred, the determining unit 130 instructs the information acquiring unit 140 to acquire component information of components corresponding to the event. If the event is one that does not need updating of the information on components in the repository, the determining unit 130 does nothing.

For example, if an event such as an error related to connection between the storage apparatus 200, the Fibre Channel switch 300, and the business server 400, and the like has occurred, the determining unit 130 determines to acquire information on components from the storage apparatus 200, the Fibre Channel switch 300, and the business server 400. Further, for example, if an event occurs that affects only the storage apparatus 200, the determining unit 130 determines to acquire information on components from the storage apparatus 200.

The information acquiring unit 140 acquires component information indicating the statuses of the components from the storage apparatus 200, the Fibre Channel switch 300, and the business server 400, in accordance with an instruction from the determining unit 130. As mentioned above, the information acquiring unit 140 may acquire component information from all of the storage apparatus 200, the Fibre Channel switch 300, and the business server 400, depending on an event determined from the SNMP trap. Further, the information acquiring unit 140 may acquire component information from one or two of the storage apparatus 200, the Fibre Channel switch 300, and the business server 400 (for example, from the storage apparatus 200). The components whose component information is acquired by the information acquiring unit 140 may be all the components of the access destination apparatus (for example, the storage apparatus 200), or may be one or some components of the access destination apparatus selected in accordance with the event that has occurred.

The management screen providing unit 150 generates display information for the management screen including information about the components of each apparatus, based on the repository stored in the storage unit 110, and provides the display information to the terminal apparatus 500. The management screen providing unit 150 is a function corresponding to a Web server.

The storage apparatus 200 includes a trap transmitting unit 250 and an apparatus information providing unit 260. The trap transmitting unit 250 and the apparatus information providing unit 260 are implemented by the processor 211. The trap transmitting unit 250 and the apparatus information providing unit 260 may be implemented by execution of a predetermined program in the RAM 212 by the processor 211.

The trap transmitting unit 250 generates an SNMP trap corresponding to an event that has occurred in the storage apparatus 200, and transmits the SNMP trap to the management server 100.

The apparatus information providing unit 260 returns, in response to a request from the information acquiring unit 140, component information about the components of the storage apparatus 200 to the information acquiring unit 140.

The Fibre Channel switch 300 includes an apparatus information providing unit 310. The apparatus information providing unit 310 is implemented by the processor 301. The apparatus information providing unit 310 may be implemented by execution of a predetermined program in the RAM 302 by the processor 301.

The apparatus information providing unit 310 returns, in response to a request from the information acquiring unit 140, component information about the components of the Fibre Channel switch 300 to the information acquiring unit 140.

The business server 400 includes an apparatus information providing unit 410. The apparatus information providing unit 410 is implemented by a processor of the business server 400. The apparatus information providing unit 410 may be implemented by execution of a program in a RAM of the business server 400 by the processor of the business server 400.

The apparatus information providing unit 410 returns, in response to a request from the information acquiring unit 140, component information about the components of the business server 400 to the information acquiring unit 140.

The terminal apparatus 500 includes a management screen display unit 510. Based on display information for a management screen provided by the management screen providing unit 150, the management screen display unit 510 displays the management screen on a display connected to the terminal apparatus 500. The management screen display unit 510 is a function corresponding to a Web browser.

FIG. 7 illustrates examples of management tables 111, 111a, 111b, and so on according to the second embodiment. The management tables 111, 111a, 111b, and so on are stored in the storage unit 110. A repository for the components includes the management tables 111, 111a, 111b, and so on. The management table 111 is used, for example, for managing information on the port 215a that is one of the components of the storage apparatus 200.

The management table 111 contains the following items: "port_no", "storage_serial_no", "ca_no", "cm_no", "port_name", "port_type", "port_status", and "link_status".

For example, the management table 111 stores the item "port_no" indicating the port number of the port 215a, and the item "storage_serial_no" indicating the serial number of the storage apparatus 200 to which the port 215a belongs.

The management table 111 also stores, for the port 215a, the channel adapter number (ca_no) of the channel adapter 215 to which the port 215a belongs, and the controller module number (cm_no) of the controller module 210 to which the port 215a belongs. The management table 111 also stores the port name (port_name) of the port 215a, and the port type (port_type). The port type indicates one of Fibre Channel, iSCSI, SAS, and so on. The management table 111 also stores the statuses (a detailed status and a link status) related to the port 215a. The detailed status (port_status) and the link status (link_status) indicate, for example, whether the port 215a is in a link-up state or in a link-down state.

There may be a case where a plurality of (for example, two or four) interfaces to which cables are connectable are provided in the single port 215a (interface card). In this case, the link status is managed for each of the interfaces to which cables are connectable.

Information on other components of the storage apparatus 200, the Fibre Channel switch 300, and the business server 400 is also managed using the management tables 111a, 111b, and so on. Each of the management tables 111a, 111b, and so on contains item names corresponding to the managed components.

FIG. 8 illustrates an example of a connection table 112 according to the second embodiment. The connection table 112 is stored in advance in the storage unit 110. The connection table 112 is information indicating the connection relationship between the storage apparatus 200, the Fibre Channel switch 300, and the business server 400.

The connection table 112 contains the following items: "server_fc_hba_wwn", "server_name", "server_side_switch_port_no", "server_side_switch_name", "storage_fc_port_wwn", "storage_port_name", "storage_serial_no", "storage_side_switch_port_no", and "storage_side_switch_name".

For example, the item "server_fc_hba_wwn" indicates the World Wide Name (WWN) of each of the host bus adapters 401 and 402 of the business server 400. The item "server_name" indicates the server name of the business server 400. The item "server_side_switch_port_no" indicates the port numbers (the port numbers of the port 304a and the port 304b) of the Fibre Channel switch 300 on the business server 400 side. The item "server_side_switch_name" indicates the switch name of the Fibre Channel switch 300 managed by the business server 400. The item "storage_fc_port_wwn" indicates the WWNs of the Fibre Channel ports (the ports 215a and 225a) of the storage apparatus 200 connected to the Fibre Channel switch 300. The item "storage_port_name" indicates the Fibre Channel port names of the corresponding Fibre Channel ports (the ports 215a and 225a).

The item "storage_serial_no" indicates the serial number of the storage apparatus 200. The item "storage_side_switch_port_no" indicates the port numbers (the port numbers of the port 304c and the port 304d) of the Fibre Channel switch 300 on the storage apparatus 200 side. The item "storage_side_switch_name" indicates the switch name of the Fibre Channel switch 300 managed by the storage apparatus 200.

In the above example, the connection table 112 manages the connection relationship between the storage apparatus 200, the Fibre Channel switch 300, and the business server 400. A connection table is provided in advance for each combination of a storage apparatus, a Fibre Channel switch, and a business server. If there are a plurality of combinations, a plurality of connection tables are provided and stored in the storage unit 110 in advance.

For example, the management server 100 may generate a connection table (including the connection table 112) by querying the storage apparatus 200, the Fibre Channel switch 300, and the business server 400 for information on the communication interface.

FIG. 9 illustrates an example of a connection status 113 according to the second embodiment. The connection status 113 is stored in the storage unit 110. The connection status 113 is information indicating a connection status in the connection relationship between the storage apparatus 200, the Fibre Channel switch 300, and the business server 400. The connection status 113 is updated by the information acquiring unit 140.

The connection status 113 contains the following items: "server_id", "sever_fc_hba_wwn", "storage_fc_port_wwn", "access_path_status", and "ap_status_reason".

The item "server_id" indicates the server ID of the business server 400. The item "server_fc_hba_wwn" indicates the WWNs of the host bus adapters 401 and 402. The item "storage_fc_port_wwn" indicates the WWNs of the Fibre Channel ports (the ports 215a and 225a) of the storage apparatus 200. The item "access_path_status" indicates the access path status representing whether the communication between the storage apparatus 200, the Fibre Channel switch 300, and the business server 400 is in a normal state or in an error state. For example, the information acquiring unit 140 determines that the access path status is a normal state if all the Fibre Channel ports used for communication between the storage apparatus 200, the Fibre Channel switch 300, and the business server 400 are in a link-up state and are operating normally. On the other hand, for example, the information acquiring unit 140 determines that the access path status is an error state if any of the Fibre Channel ports of the storage apparatus 200, the Fibre Channel switch 300, and the business server 400 that are used for communication therebetween is in a link-down state. The item "ap_status_reason" indicates the cause of an error if the access path status is an error state. For example, the information acquiring unit 140 may register, as the error cause, information indicating which of the storage apparatus 200, the Fibre Channel switch 300 and the business server 400 has a Fibre channel port in a link-down state.

FIG. 10 illustrates a trap type list 114 according to the second embodiment. The trap type list 114 is stored in advance in the storage unit 110. The trap type list 114 is information indicating a corresponding relationship between the identification information of Specific Trap Type in an SNMP trap and the content of an event indicated by the identification information. The Specific Trap Type is a vendor-specific trap type. The Specific Trap Type is included in an SNMP trap. The trap type list 114 contains the "Specific Trap Type" field and the "Content" field.

The "Specific Trap Type" field stores the number representing a Specific Trap Type. The "Content" field stores the content of an event indicated by the corresponding Specific Trap Type.

For example, the trap type list 114 stores Specific Trap Type "2" in association with the content "Notification of Failure or Degradation of Component". That is, Specific Trap Type=2 notified by an SNMP trap indicates that a component of the storage apparatus 200 has failed or degraded.

Similarly, the trap type list 114 stores information indicating that Specific Trap Types "3", "6", and "7" are notifications of errors such as "Battery Expiration", "Event That Needs Preventive Maintenance", "Temperature Error", and the like that have occurred in the storage apparatus 200.

Here, the "Event That Needs Preventive Maintenance" is an event for which preventive maintenance needs to be performed to maintain the normal operation of the system. An example of the "Event That Needs Preventive Maintenance" is an event in which, in a storage device including a storage element with a limited number of writes such as SSD, the number of writes to the storage element has reached the threshold. That is, by encouraging maintenance such as replacing such an SSD in advance, it is possible to maintain the normal operation while preventing a failure such as data loss due to the number of writes to the storage element exceeding the upper limit.

The trap type list 114 also stores Specific Trap Type "9" in association with the content "Completion of Deletion of RAID Group". This indicates that Specific Trap Type=9 is a notification of completion of a RAID group deletion process by automated storage tiering of the storage apparatus 200.

Automated storage tiering is a function that, in an environment in which different types of drives are present, detects the data access frequency, and relocates data between a drive of the first type and a drive of the second type. The types of drives may include, for example, the following three types: SSD, online disk (for example, SAS HDD), and nearline disk (for example, Serial ATA (SATA) HDD). For example, at the beginning of the operation, data is stored in an online disk. Then, less frequently used data is moved to a relatively high capacity, inexpensive nearline disk to reduce the cost of storing data. Meanwhile, frequently accessed data is moved to a relatively high performance SSD to reduce the response time and improve the performance.

In automated storage tiering, a RAID group providing a storage area is often deleted. In this case, the RAID group is deleted after moving the data stored in that storage area to a storage area other than the RAID group that is deleted. The storage apparatus 200 notifies the management server 100 of the progress and completion of such a RAID group deletion process, using a vendor-specific trap type.

The trap type list 114 also stores Specific Trap Type "10" in association with the content "Notification of Link Status of Channel Adapter Port". This indicates that Specific Trap Type=10 is a notification of the link statuses of the port 215a of the channel adapter 215 and the port 225a of the channel adapter 225 included in the storage apparatus 200. The link status of each of the ports 215a and 225a may include link-up and link-down.

The trap type list 114 also stores Specific Trap Type "14" in association with the content "Notification of Error in Automated Storage Tiering". This indicates that Specific Trap Type=14 is a notification of an error (for example, interruption of a RAID group deletion process) in automated storage tiering of the storage apparatus 200.

The trap type list 114 also stores Specific Trap Type "22" in association with the content "Notification of Alarm Cancellation for TRAP #2". This indicates that Specific Trap Type=22 is a notification of cancellation of alarm for an error of Specific Trap Type=2.

The trap type list 114 also stores Specific Trap Type "25" in association with the content "Notification of Alarm Cancellation for TRAP #5". This indicates that Specific Trap Type=25 is a notification of cancellation of alarm for an error of Specific Trap Type=5.

The trap type list 114 also stores Specific Trap Type "26" in association with the content "Notification of Alarm Cancellation for TRAP #6". This indicates that Specific Trap Type=26 is a notification of cancellation of alarm for an error of Specific Trap Type=6.

Next, a description will be given of the procedures performed by the management server 100 and the storage apparatus 200.

Figure 11:
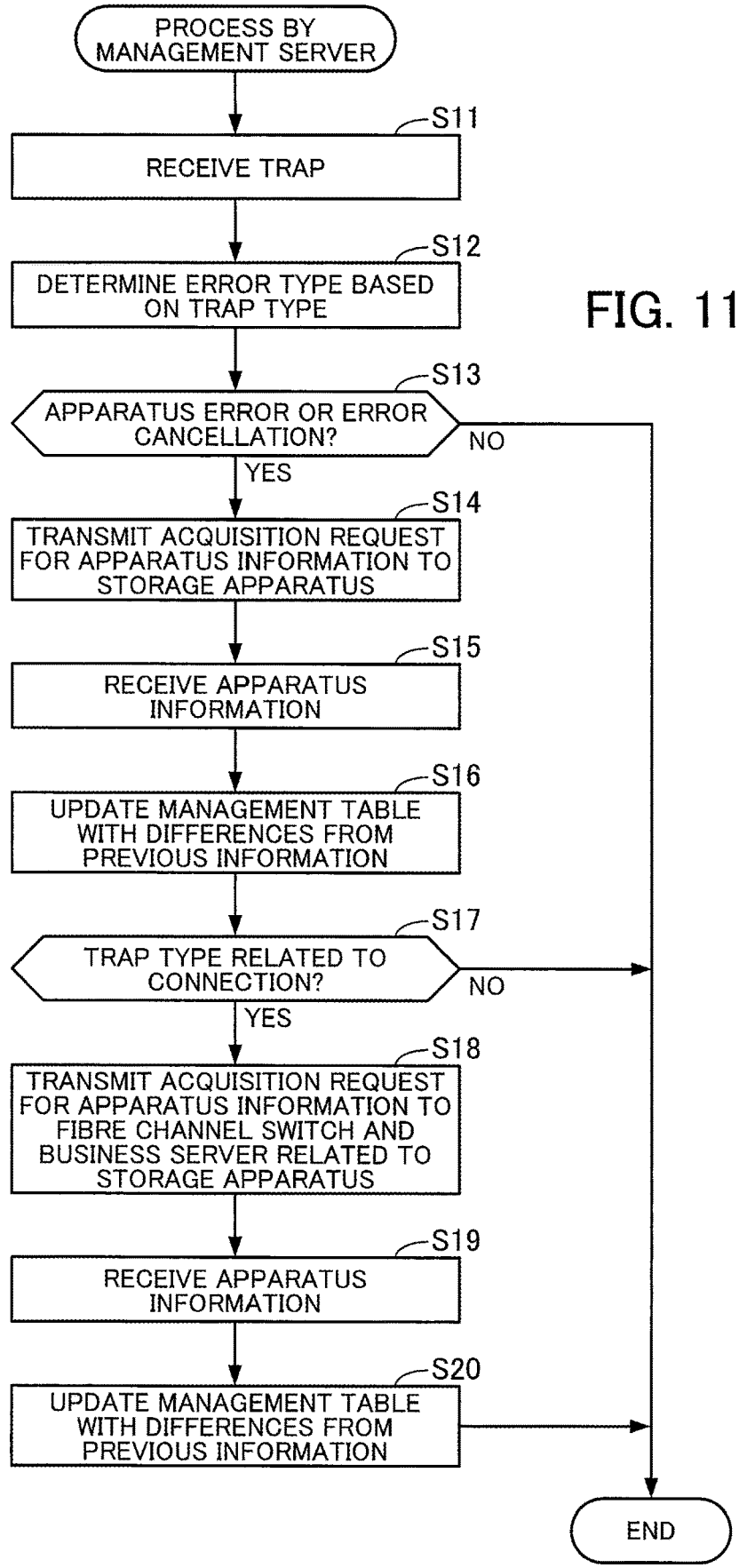
FIG. 11 is a flowchart illustrating an example of a process performed by the management server according to the second embodiment.

FIG. 11 is a flowchart illustrating an example of a process performed by the management server 100 according to the second embodiment. In the following, the process illustrated in FIG. 11 will be described step by step.

(S11) The trap receiving unit 120 receives an SNMP trap from the storage apparatus 200. The SNMP trap is an example of a notification of a state change of the storage apparatus 200.

(S12) The determining unit 130 determines the error type based on the trap type included in the SNMP trap. More specifically, the determining unit 130 obtains Specific Trap Type included in the received SNMP, and checks the obtained Specific Trap Type against the trap type list 114 stored in the storage unit 110. As mentioned above, the trap type list 114 stores Specific Trap Types (2, 3, 5, 6, 7, 10, and 14) corresponding to apparatus errors, and Specific Trap Types (22, 25, and 26) corresponding to error cancellation.

(S13) The determining unit 130 determines whether Specific Trap Type indicates an apparatus error or error cancellation. If Specific Trap Type indicates an apparatus error or error cancellation, the determining unit 130 instructs the information acquiring unit 140 to collect apparatus information of the storage apparatus 200. Then, the process proceeds to step S14. If Specific Trap Type does not indicate either an apparatus error or error cancellation, the process ends. The apparatus information of the storage apparatus 200 is information including component information of all the components of the storage apparatus 200 managed by the management server 100.

(S14) The information acquiring unit 140 transmits an acquisition request for apparatus information of the storage apparatus 200 to the storage apparatus 200.

(S15) The information acquiring unit 140 receives apparatus information from the storage apparatus 200.

(S16) The information acquiring unit 140 updates the management tables 111, 111a, 111b, and so on stored in the storage unit 110, with the differences from the previous information. More specifically, the information acquiring unit 140 reflects the differences between the current apparatus information collected from the storage apparatus 200 and the information stored in the management tables 111, 111a, 111b, and so on, in the management tables 111, 111a, 111b, and so on.

(S17) The determining unit 130 determines whether Specific Trap Type determined in step S13 is a trap type related to connection. The trap type related to connection is Specific Trap Type=10. If Specific Trap Type is a trap type related to connection, the determining unit 130 instructs the information acquiring unit 140 to collect apparatus information of apparatuses related to the storage apparatus 200. Then, the process proceeds to step S18. If Specific Trap Type is not a trap type related to connection, the process ends.

(S18) The information acquiring unit 140 refers to the connection table 112 stored in the storage unit 110 to specify the Fibre Channel switch 300 and the business server 400 related to the storage apparatus 200. The information acquiring unit 140 transmits a request for transmission of apparatus information to the Fibre Channel switch 300 and the business server 400. The apparatus information of the Fibre Channel switch 300 is information including component information of all the components of the Fibre Channel switch 300 managed by the management server 100. The apparatus information of the business server 400 is information including component information of all the components of the business server 400 managed by the management server 100.

(S19) The information acquiring unit 140 receives apparatus information from the Fibre Channel switch 300. The information acquiring unit 140 receives apparatus information from the business server 400.

(S20) The information acquiring unit 140 updates the management tables 111, 111a, 111b, and so on, with the differences from the previous apparatus information. More specifically, the information acquiring unit 140 reflects the differences between the current apparatus information collected from the Fibre Channel switch 300 and the information stored in the management tables 111, 111a, 111b, and so on, in the management tables 111, 111a, 111b, and so on. Similarly, the information acquiring unit 140 reflects the differences between the current apparatus information collected from the business server 400 and the information stored in the management tables 111, 111a, 111b, and so on, in the management tables 111, 111a, 111b, and so on. Further, the information acquiring unit 140 also updates the access path status and the error cause in the connection status 113 stored in the storage unit 110, based on the collected apparatus information.

Figure 12:
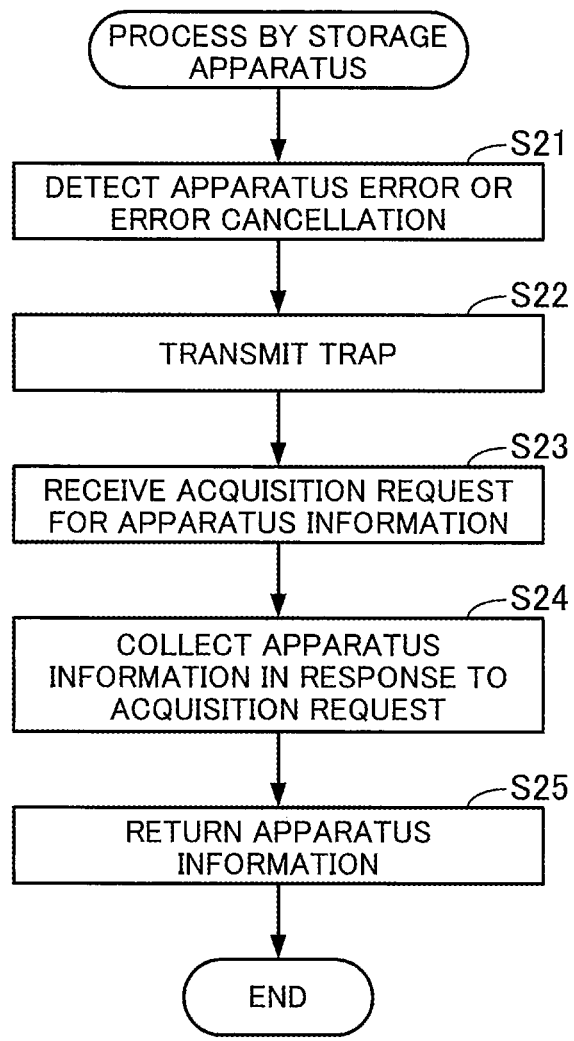
FIG. 12 is a flowchart illustrating an example of a process performed by a storage according to the second embodiment.

FIG. 12 is a flowchart illustrating an example of a process performed by a storage according to the second embodiment. In the following, the process illustrated in FIG. 12 will be described step by step.

(S21) The trap transmitting unit 250 detects an apparatus error or error cancellation in the storage apparatus 200.

(S22) The trap transmitting unit 250 generates an SNMP trap corresponding to the detected apparatus error or error cancellation, and transmits the generated SNMP trap to the management server 100.

(S23) The apparatus information providing unit 260 receives an acquisition request for apparatus information from the management server 100.

(S24) The apparatus information providing unit 260 collects apparatus information in response to the acquisition request. More specifically, the apparatus information providing unit 260 collects component information of all the components managed by the management server 100 among the plurality of components of the storage apparatus 200. The apparatus information providing unit 260 may acquire component information of those components by, for example, querying those components for component information. Alternatively, the apparatus information providing unit 260 may collect apparatus information in advance (for example, at predetermined intervals) into a predetermined storage device of the storage apparatus 200, for example. In this case, the apparatus information providing unit 260 may read the apparatus information from the storage device, in response to an acquisition request from the management server 100.

(S25) The apparatus information providing unit 260 returns the apparatus information collected in step S24 to the management server 100.

As with the apparatus information providing unit 260, the apparatus information providing unit 310 of the Fibre Channel switch 300 also returns apparatus information of the Fibre Channel switch 300 to the management server 100, in response to an acquisition request for apparatus information from the management server 100. As with the apparatus information providing unit 260, the apparatus information providing unit 410 of the business server 400 also returns apparatus information of the business server 400 to the management server 100, in response to an acquisition request for apparatus information from the management server 100.

In the example of step S13 of FIG. 11, the determining unit 130 transmits an acquisition request for apparatus information to the storage apparatus 200 when there is an apparatus error or error cancellation. However, the determining unit 130 may transmit an acquisition request for apparatus information upon receiving a completion notification of a predetermined process by automated storage tiering. For example, when Specific Trap Type in an SNMP trap is "9", the determining unit 130 may transmit an acquisition request for apparatus information, and acquire apparatus information of the storage apparatus 200. Thus, it is possible to appropriately recognize the statuses of the various drives (HDD, SSD, and so on), after completion of a RAID group deletion process involving data migration by automated storage tiering or at other time.

Upon receiving an SNMP trap indicating a state change of the storage apparatus 200, the management server 100 determines whether to query for component information of the components related to the storage apparatus 200, in accordance with the content of the SNMP trap. If the SNMP trap indicates an apparatus error, error cancellation, or completion of a predetermined process (data migration between different types of drives, deletion of a RAID group, or the like) of automated storage tiering, the management server 100 determines to query for component information. If the SNMP trap does not indicate an apparatus error, error cancellation, or the like, the management server 100 determines not to query for component information.

If a determination is made to query for component information, the management server 100 selects one or more query target components in accordance with the content of the SNMP trap. For example, as mentioned above, if an apparatus error or error cancellation indicated by an SNMP trap affects only the storage apparatus 200, the management server 100 selects the components of the storage apparatus 200 as the query targets. If the apparatus error or error cancellation affects not only the storage apparatus 200 but also the Fibre Channel switch 300 and the business server 400, the management server 100 selects the components of the storage apparatus 200, the Fibre Channel switch 300, and the business server 400 as the query targets. The management server 100 acquires component information of the selected query target components from the apparatuses (the storage apparatus 200, the Fibre Channel switch 300, and the business server 400) including those components, and updates the management tables 111, 111a, 111b, and so on.

In the manner described above, in response to a state change of the storage apparatus 200, the management server 100 autonomously accesses the components, checks component information of the components related to the storage apparatus 200, and updates the management tables 111a, 111b, 111c, and so on. Further, in the case of an SNMP trap notifying a state change related to communication, the management server 100 also updates the access path status of the connection status 113, based on the apparatus information collected from each apparatus. Thus, it is possible to improve the accuracy of the information registered in the management tables 111a, 111b, 111c, and so on and the connection status 113.

In the above description, the management server 100 acquires, as apparatus information, component information of all the components that are managed for an apparatus of interest. However, the management server 100 may acquire component information of one or some components corresponding to the content of the SNMP trap. For example, the information acquiring unit 140 may narrow down the query target components, in accordance with Specific Trap Type notified by the SNMP trap. For example, consider an event of Specific Trap Type=10. In this case, based on the connection table 112 stored in the storage unit 110, the information acquiring unit 140 may narrow down the query target components to the channel adapters 215 and 225, the ports 304a, 304b, and so on, and the host bus adapters 401 and 402. In the case where the SNMP trap is a notification of the progress of a process of automated storage tiering as described above, the information acquiring unit 140 may narrow down the query target components to HDDs and SSDs. In this manner, by collecting component information of only the components closely related to a state change of interest, it is possible to reduce the likelihood that component information of irrelevant components is collected. Further, it is possible to reduce the amount of information collected by the management server 100, and reduce the communication load for operational management on the network 10.

The management screen providing unit 150 provides a management screen to the terminal apparatus 500, based on the management tables 111, 111a, 111b, and so on updated using the procedure of FIG. 11 and the connection status 113. The management screen providing unit 150 adds the statuses of the components requested by the management screen display unit 510 to the information of the management screen.

For example, the user may specify for the management screen display unit 510 the components to be checked, by operating an input device connected to the terminal apparatus 500. The management screen display unit 510 requests the management screen providing unit 150 for information indicating the specified components in accordance with the instruction from the user. The management screen display unit 510 obtains information of the management screen including the statuses of the specified components from the management screen providing unit 150, and displays the management screen on the display connected to the terminal apparatus 500. The user may check the statuses of the desired components by referring to the management screen.

The management server 100 improves the accuracy of the management tables 111, 111a, 111b, and so on and the connection status 113, and thereby provides appropriate statuses of components to the user. Thus, the management server 100 is able to support appropriate operational management of the information processing system by the user.

(c) Third Embodiment

Hereinafter, a third embodiment will be described. The following mainly describes the differences from the second embodiment, and features common thereto will not be described herein.

In the second embodiment, a state change of the storage apparatus 200 is notified to the management server 100 by an SNMP trap. However, a notification of a state change may be a response to polling. Thus, the third embodiment illustrates an example where a notification of a state change is transmitted as a response to polling.

The information processing system of the third embodiment includes a management server 100a, in place of the management server 100. Further, the information processing system of the third embodiment includes a storage apparatus 200a, in place of the storage apparatus 200. The management server 100a may be implemented with the same hardware as that of the management server 100. The hardware elements of the management server 100a are denoted by the same names and reference numerals as those of the management server 100. The storage apparatus 200a may be implemented with the same hardware as that of the storage apparatus 200. The hardware elements of the storage apparatus 200a are denoted by the same names and reference numerals as those of the storage apparatus 200.

Figure 13:
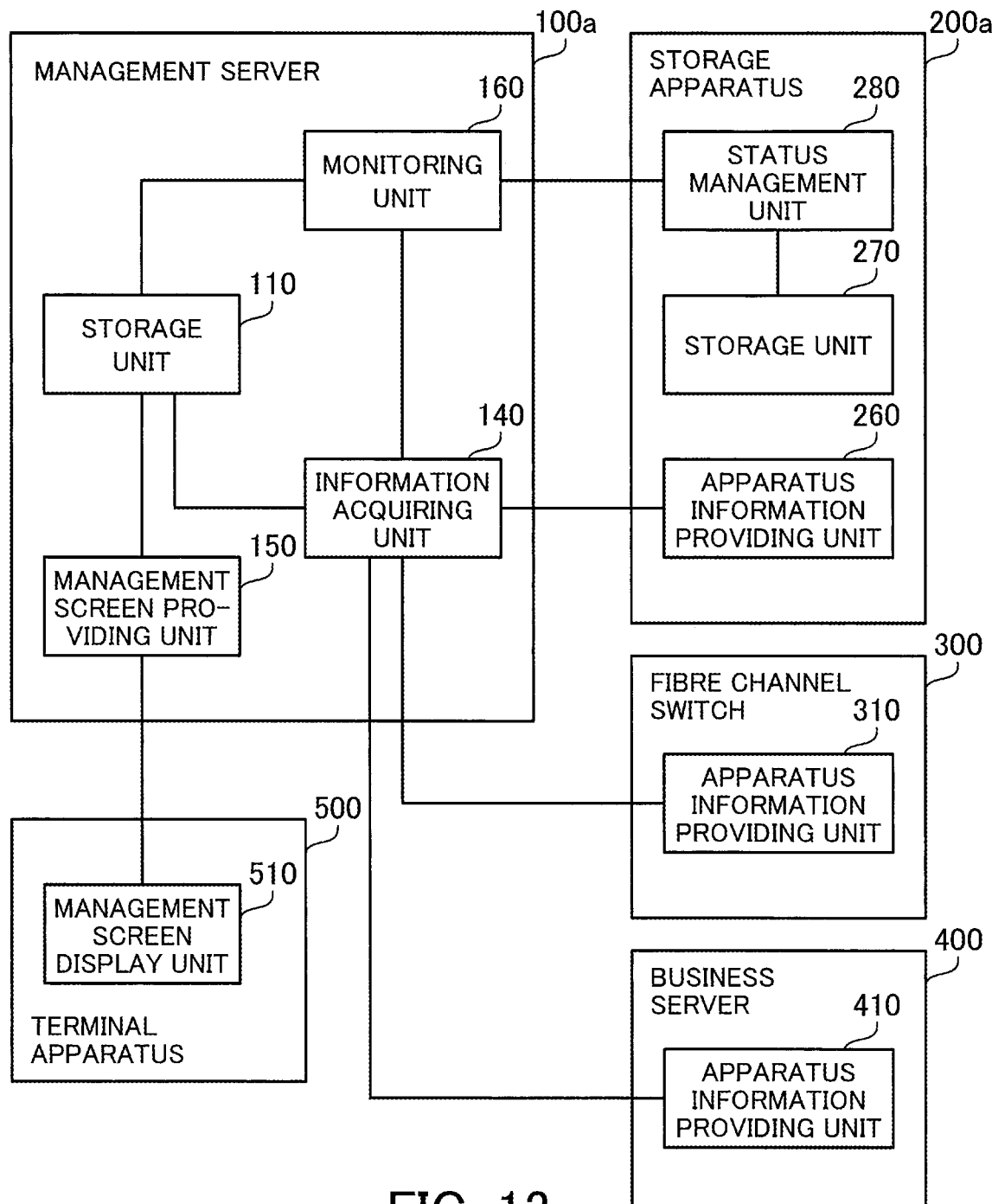
FIG. 13 illustrates an example of functions according to a third embodiment.

FIG. 13 illustrates an example of functions according to the third embodiment. The management server 100a includes a storage unit 110, an information acquiring unit 140, a management screen providing unit 150, and a monitoring unit 160. The storage unit 110, the information acquiring unit 140, and the management screen providing unit 150 correspond to the functions of the management server 100 of the same names. The monitoring unit 160 is implemented by execution of a program in the RAM 102 by the processor 101.

The storage unit 110 stores the value of a predetermined counter managed by a managed apparatus (in this example, the storage apparatus 200a), in addition to the information illustrated in the second embodiment. The predetermined counter managed by the storage apparatus 200a is a counter that is incremented upon a configuration change to the storage apparatus 200a such as component replacement and the like.

The information acquiring unit 140 acquires apparatus information from the storage apparatus 200a, in accordance with an instruction from the monitoring unit 160. The information acquiring unit 140 may acquire apparatus information from the Fibre Channel switch 300 and the business server 400, in accordance with an instruction from the monitoring unit 160.

The monitoring unit 160 monitors the status of the storage apparatus 200a. More specifically, the monitoring unit 160 periodically performs polling for status monitoring to the storage apparatus 200a. In polling, the monitoring unit 160 transmits to the storage apparatus 200a a request for acquiring the value of a predetermined counter managed by the storage apparatus 200a. The monitoring unit 160 receives a response (the value of the counter) to the request. For example, the monitoring unit 160 executes polling at intervals of a few tens of seconds to a few minutes (for example, 30 seconds).

The monitoring unit 160 may perform polling using an SNMP request and an SNMP response. For example, the monitoring unit 160 may transmit an SNMP request related to a counter of interest to the storage apparatus 200a, and receive an SNMP response including the value of the counter from the storage apparatus 200a.

The monitoring unit 160 compares the value of the counter obtained by the current polling with the previously obtained value of the counter. If the two values are different, the monitoring unit 160 determines that there is a state change in the storage apparatus 200a, and instructs the information acquiring unit 140 to acquire apparatus information of the storage apparatus 200a.

The storage apparatus 200a includes an apparatus information providing unit 260, a storage unit 270, and a status management unit 280. The apparatus information providing unit 260 corresponds to the function of the same name in the storage apparatus 200 of the second embodiment. The storage unit 270 is implemented with a storage area reserved in the RAM 212 or the NVRAM 213. The status management unit 280 may be implemented by execution of a program in the RAM 212 by the processor 211.

The storage unit 270 stores the value of a counter used for managing the status of the storage apparatus 200a.

The status management unit 280 monitors a state change of the storage apparatus 200a, and updates the value of the counter stored in the storage unit 270 upon detecting a state change. For example, the status management unit 280 increments the value of the counter by one in response to detection of a state change of the storage apparatus 200a. Examples of state changes of the storage apparatus 200a include occurrence of a failure, replacement of components in the storage apparatus 200a, and so on.

The status management unit 280 reads, in response to a request from the monitoring unit 160, the value of the counter stored in the storage unit 270, and returns the read value to the monitoring unit 160.

The functions of the Fibre Channel switch 300, the business server 400, and the terminal apparatus 500 are the same as those of the second embodiment, and will not be described herein.

Figure 14:
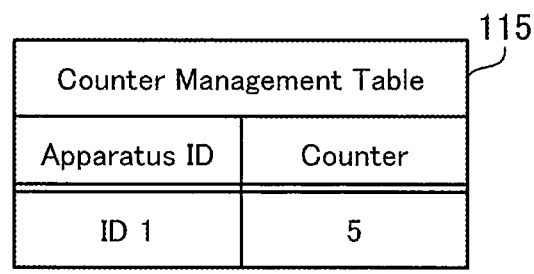
FIG. 14 illustrates an example of a counter management table according to the third embodiment.

FIG. 14 illustrates an example of a counter management table 115 according to the third embodiment. The counter management table 115 is information used for recording the value of a counter obtained from the storage apparatus 200a. The counter management table 115 is stored in the storage unit 110. The counter management table 115 contains the "Apparatus ID" field and the "Counter" field.

The "Apparatus ID" filed stores the identifier of an apparatus (apparatus ID). The "Counter" field stores the value of a counter obtained from the apparatus. Here, the apparatus ID of the storage apparatus 200a is "ID 1"

For example, the counter management table 115 stores a record including the apparatus ID "ID 1" and the counter "5". This indicates that the value (value obtained by previous polling) of the counter of the storage apparatus 200a identified by the apparatus ID "ID 1" is "5". Note that in the case where the management server 100a stores the counter values of a plurality of apparatuses, a record is added to the counter management table 115 for each apparatus.

Next, a description will be given of the procedures performed by the management server 100a and the storage apparatus 200a.

Figure 15:
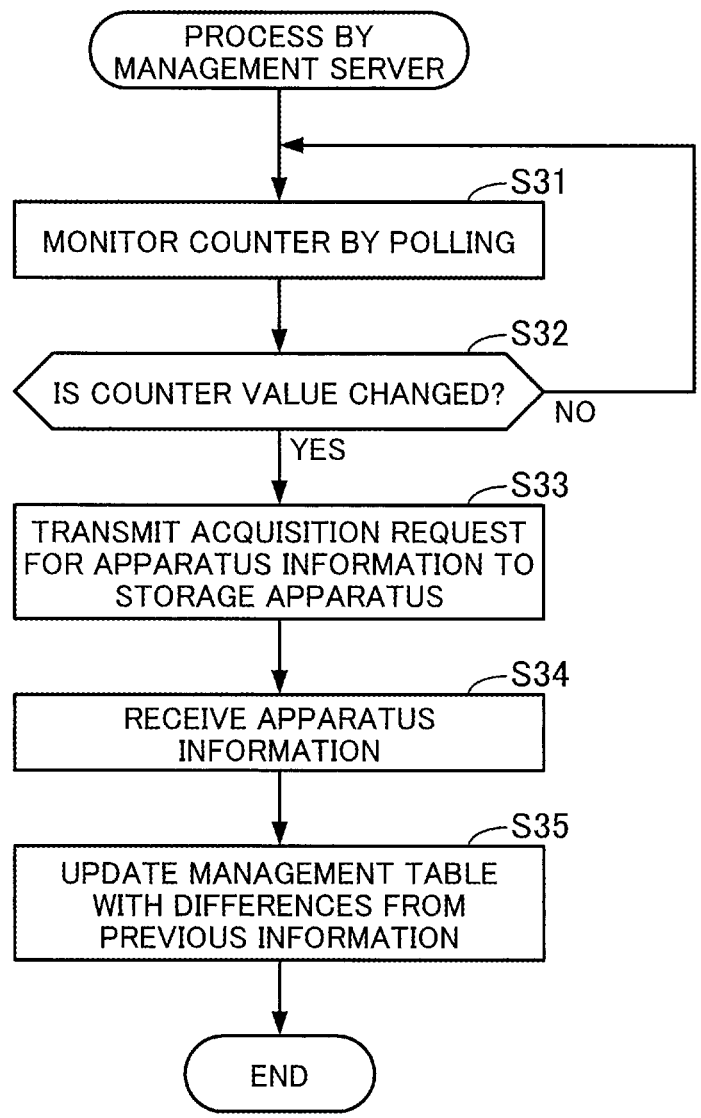
FIG. 15 is a flowchart illustrating an example of a process performed by a management server according to the third embodiment.

FIG. 15 is a flowchart illustrating an example of a process performed by the management server 100a according to the third embodiment. In the following, the process illustrated in FIG. 15 will be described step by step.

(S31) The monitoring unit 160 monitors the counter of the storage apparatus 200a by polling. As mentioned above, the polling interval is, for example, 30 seconds.

(S32) The monitoring unit 160 compares the current value of the counter and the previous value of the counter stored in the counter management table 115 of the storage unit 110, and determines whether the counter value is changed. If the counter value is changed, the monitoring unit 160 instructs the information acquiring unit 140 to acquire apparatus information of the storage apparatus 200a. Then, the process proceeds to step S33. If the counter value is not changed, the process returns to step S31 in which the monitoring unit 160 continues monitoring of the counter value by polling. Note that upon completion of the determination of step S32, the monitoring unit 160 stores the current value of the counter in the "Counter" field corresponding to the storage apparatus 200a in the counter management table 115, (by overwriting the previous value of the counter).

(S33) The information acquiring unit 140 transmits an acquisition request for apparatus information of the storage apparatus 200a to the storage apparatus 200a.

(S34) The information acquiring unit 140 receives apparatus information from the storage apparatus 200a.

(S35) The information acquiring unit 140 updates the management tables 111, 111a, 111b, and so on stored in the storage unit 110, with the differences from the previous information. More specifically, the information acquiring unit 140 reflects the differences between the current apparatus information collected from the storage apparatus 200a and the information stored in the management tables 111, 111a, 111b, and so on, to the management tables 111, 111a, 111b, and so on.

After the operation of step S35 is performed by the information acquiring unit 140, the monitoring unit 160 restarts the procedure of FIG. 15 from step S31.

Figure 16:
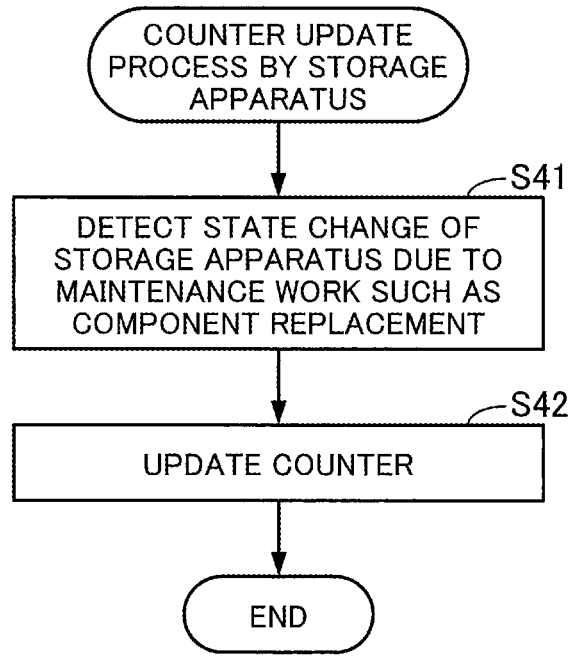
FIG. 16 is a flowchart illustrating an example of counter update by a storage according to the third embodiment.

FIG. 16 is a flowchart illustrating an example of counter update by a storage according to the third embodiment. In the following, the process illustrated in FIG. 16 will be described step by step.

(S41) The status management unit 280 detects a state change of the storage apparatus 200a due to maintenance work such as component replacement and the like. For example, the status management unit 280 detects a state change of the storage apparatus 200a when any of the HDDs (or SSDs) accommodated in the drive enclosure 230 of the storage apparatus 200a is replaced.

(S42) The status management unit 280 updates the value of the counter stored in the storage unit 270.

In the above example, a state change due to maintenance work is illustrated. However, the status management unit 280 may update the value of the counter stored in the storage unit 270 in response to a state change such as an error or recovery from an error in the storage apparatus 200a, and the like.

Figure 17:
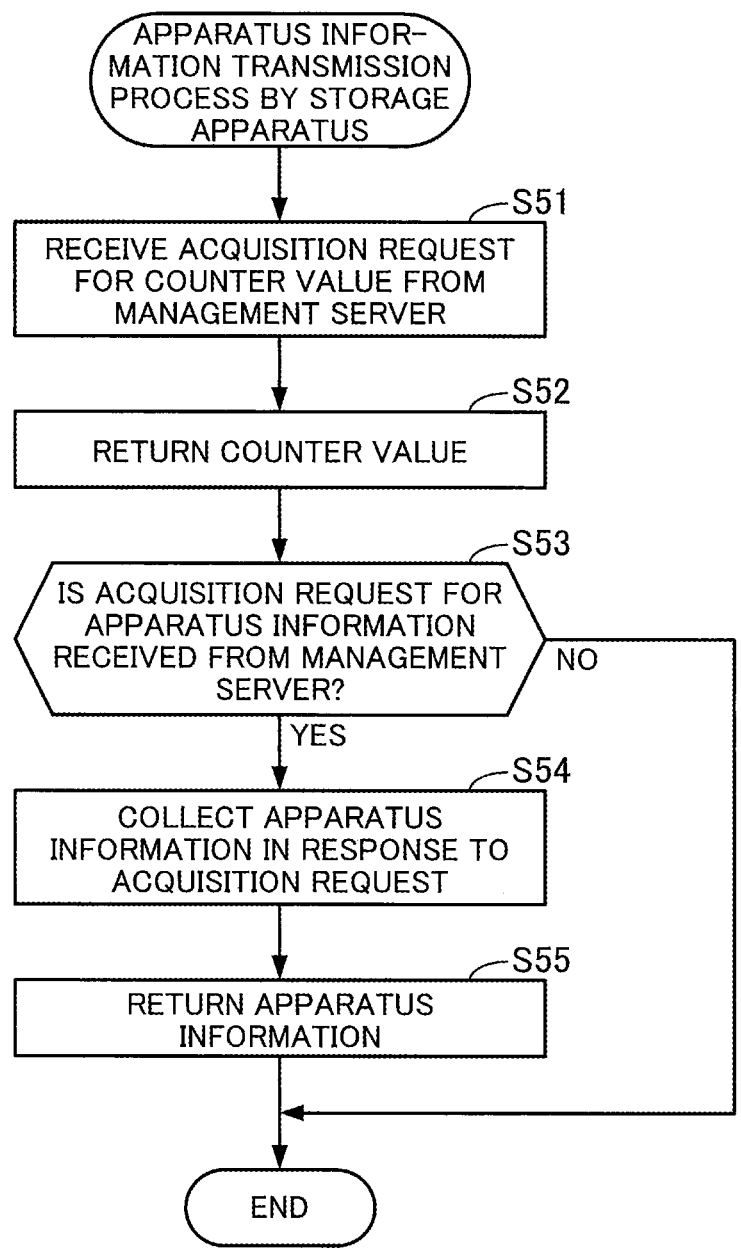
FIG. 17 is a flowchart illustrating an example of apparatus information transmission by the storage according to the third embodiment.

FIG. 17 is a flowchart illustrating an example of apparatus information transmission by the storage according to the third embodiment. In the following, the process illustrated in FIG. 17 will be described step by step.

(S51) The status management unit 280 receives from the management server 100 a request for acquiring the value of the counter stored in the storage unit 270.

(S52) The status management unit 280 returns the value of the counter to the management server 100a.

(S53) The apparatus information providing unit 260 determines whether an acquisition request for apparatus information is received from the management server 100a. If an acquisition request for apparatus information is received, the process proceeds to step S54. If an acquisition request for apparatus information is not received, the process ends.

(S54) The apparatus information providing unit 260 collects apparatus information in response to the acquisition request. More specifically, the apparatus information providing unit 260 collects component information of all the components managed by the management server 100a among the plurality of components of the storage apparatus 200a. The apparatus information providing unit 260 may acquire component information of those components by, for example, querying those components for component information. Alternatively, the apparatus information providing unit 260 may collect apparatus information in advance (for example, at predetermined intervals) into the storage unit 270, for example. In this case, the apparatus information providing unit 260 may read the apparatus information from the storage unit 270, in response to an acquisition request from the management server 100a.

(S55) The apparatus information providing unit 260 returns the apparatus information collected in step S54 to the management server 100a.

In the manner described above, the management server 100a checks a state change of the storage apparatus 200a by polling. Then, upon detection of a state change of the storage apparatus 200a, the management server 100a autonomously accesses the components, and updates the management tables 111a, 111b, 111c, and so on. Thus, as in the case of the second embodiment, it is possible to improve the accuracy of the information registered in the management tables 111a, 111b, 111c, and so on.

In particular, in the case of replacing components such as HDDs and the like, the storage apparatus 200a may operate in a maintenance mode (an operation mode for performing maintenance work and is different from a normal mode for normal operation). In the maintenance mode, an SNMP trap notification function and other functions that operate in the normal mode are often restricted. Accordingly, the management server 100a monitors the storage apparatus 200a by polling, and thereby appropriately detects a state change of the storage apparatus 200a.

In the above description, the management server 100a acquires, as apparatus information, component information of all the components that are managed for an apparatus of interest. However, other methods may be used. For example, the storage apparatus 200a may be provided with counters one for each component (or each group of components) such that a state change is managed for each component (or each group of components). In this case, the management server 100a stores the values of the plurality of counters, and performs polling to the storage apparatus 200a to acquire the values of the plurality of counters. Then, the management server 100a acquires component information of the component corresponding to the counter whose value has been changed, from the storage apparatus 200a. In this manner, by collecting component information of only the components closely related to a state change, it is possible to reduce the likelihood that component information of irrelevant components is collected. In this case, since the amount of information collected by the management server 100a is reduced, it is possible to reduce the communication load for operational management on the network 10.

The management server 100a may determine when to collect component information, based on the difference between the value of the counter at the time of the previous collection of apparatus information and the current value. For example, the management server 100a may acquire apparatus information when the difference in the value of the counter becomes greater than or equal to a predetermined value. In this manner, it is possible to control time when the management server 100a collects apparatus information, based on the value of the counter.

In the manner described above, the management server 100a improves the accuracy of the management tables 111, 111a, 111b, and so on, and thereby provides appropriate statuses of components to the user. Accordingly, the management server 100a is able to support appropriate operational management of the information processing system by the user.

(d) Fourth Embodiment

Hereinafter, a fourth embodiment will be described. The following mainly describes the differences from the second and third embodiments, and features common thereto will not be described herein.

In the third embodiment, the management server 100a obtains the value of the counter managed by the storage apparatus 200a, by performing polling. However, the management server 100a may check information other than the value of the counter, by performing polling. For example, in the fourth embodiment, the management server 100a manages the overall status of the storage apparatus 200a, by performing polling. The overall status is information indicating the status of the entire storage apparatus 200a.

The apparatuses included in the information processing system of the fourth embodiment and the hardware elements of each of the apparatuses are denoted by the same names and reference numerals as those of the third embodiment. Note that the monitoring unit 160 periodically monitors the overall status of the storage apparatus 200a by polling. Further, the status management unit 280 periodically updates the overall status of the storage apparatus 200a, and stores the overall status in the storage unit 270.

The overall status of the storage apparatus 200a includes "Normal", "Error", and "Warning". The "Normal" indicates that the storage apparatus 200a is operating normally. The "Error" indicates that an error has occurred to part of the operation of the storage apparatus 200a. The "Warning" indicates that an event has occurred that does not greatly affect the current operation of the storage apparatus 200a but needs measures such as inspection and maintenance by the administrator and the like.

Figure 18:
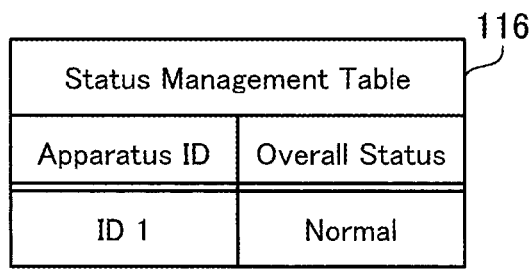
FIG. 18 illustrates an example of a status management table according to a fourth embodiment.

FIG. 18 illustrates an example of a status management table 116 according to the fourth embodiment. The status management table 116 is stored in the storage unit 110. The status management table 116 contains the "Apparatus ID" field and the "Overall Status" field.

The "Apparatus ID" field stores the ID of a managed apparatus. The "Overall Status" filed stores the overall status of the apparatus. For example, the status management table 116 stores a record including the apparatus ID "ID 1" and the overall status "Normal". This indicates that the overall status of the storage apparatus 200a identified by the apparatus ID "ID 1" is "Normal", and the storage apparatus 200a is operating normally.

Note that in the case where the management server 100a manages the overall statuses of a plurality of apparatuses, a plurality of records corresponding to the managed apparatuses are stored in the status management table 116.

Next, a description will be given of the procedures performed by the management server 100*a* and the storage apparatus 200*a*.

Figure 19:
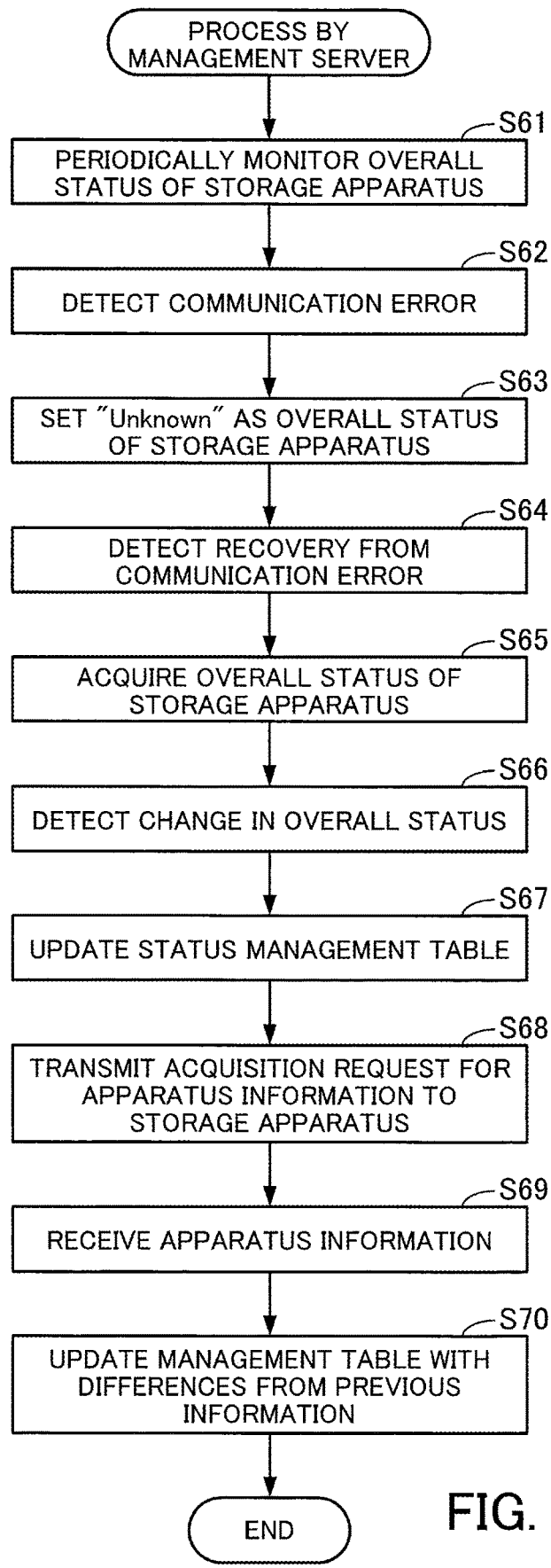
FIG. 19 is a flowchart illustrating an example of a process performed by a management server according to the fourth embodiment.

FIG. 19 is a flowchart illustrating an example of a process performed by the management server 100*a* according to the fourth embodiment. In the following, the process illustrated in FIG. 19 will be described step by step.

(S61) The monitoring unit 160 periodically monitors the overall status of the storage apparatus 200*a* by polling. The monitoring unit 160 updates the status management table 116 stored in the storage unit 110, based on the monitoring results. Note that, the polling interval is, for example, 30 seconds. For example, the monitoring unit 160 stores "Normal" for the storage apparatus 200*a* in the status management table 116.

(S62) The monitoring unit 160 detects a communication error in the communication with the storage apparatus 200*a*. For example, the monitoring unit 160 may detect a communication error by detecting that polling to the storage apparatus 200*a* via the network 10 has failed (there is no response from the storage apparatus 200*a*).

(S63) The monitoring unit 160 sets "Unknown" as the overall status of the storage apparatus 200*a*. However, the monitoring unit 160 may retain the overall status having been stored before step S63 in the storage unit 110.

(S64) The monitoring unit 160 detects recovery from the communication error. For example, the monitoring unit 160 may detect recovery from the communication error when reception of a response from the storage apparatus 200*a* to periodic polling is resumed.

(S65) The monitoring unit 160 acquires the overall status of the storage apparatus 200*a*. More specifically, the monitoring unit 160 transmits to the storage apparatus 200*a* a status request for transmission of the overall status, and receives the overall status from the storage apparatus 200*a* as a response to the status request. For example, the monitoring unit 160 acquires the overall status "Error".

(S66) The monitoring unit 160 detects a change in the overall status of the storage apparatus 200*a*. For example, the monitoring unit 160 may detect a change in the overall status by comparing the overall status (for example, "Normal") before detection of the communication error with the overall status (for example, "Error") after recovery from the communication error. Alternatively, the monitoring unit 160 may detect a change in the overall status by comparing the overall status (for example, "Unknown") after occurrence of the communication error with the overall status (for example, "Error") after recovery from the communication error.

(S67) The monitoring unit 160 updates the status management table 116. More specifically, the monitoring unit 160 registers, in the status management table 116, the overall status acquired in step S65. The monitoring unit 160 instructs the information acquiring unit 140 to acquire apparatus information of the storage apparatus 200*a*.

(S68) The information acquiring unit 140 transmits an acquisition request for apparatus information of the storage apparatus 200*a* to the storage apparatus 200*a*.

(S69) The information acquiring unit 140 receives apparatus information from the storage apparatus 200*a*.

(S70) The information acquiring unit 140 updates the management tables 111, 111*a*, 111*b*, and so on stored in the storage unit 110, with the differences from the previous information. More specifically, the information acquiring unit 140 reflects the differences between the current apparatus information collected from the storage apparatus 200*a* and the information stored in the management tables 111, 111*a*, 111*b*, and so on, to the management tables 111, 111*a*, 111*b*, and so on.

There may be a case where, in step S66, the monitoring unit 160 does not detect a change in the overall status. In this case, the process may skip steps S67 to S70 and go to the end. That is, the monitoring unit 160 acquires apparatus information from the storage apparatus 200*a* if a change in the overall status is detected, and does not acquire apparatus information from the storage apparatus 200*a* if a change in the overall status is not detected.

Figure 20:
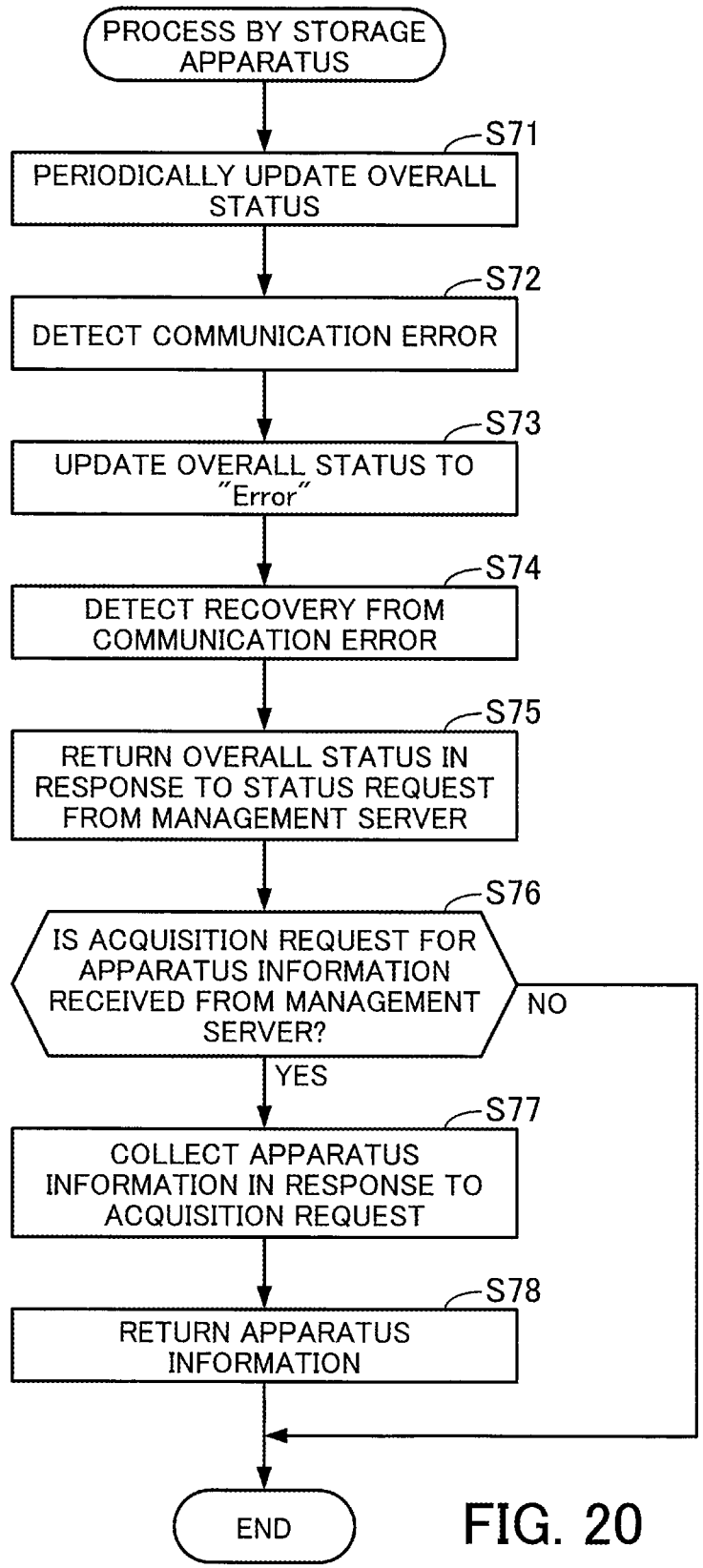
FIG. 20 is a flowchart illustrating an example of a process performed by a storage according to the fourth embodiment.

FIG. 20 is a flowchart illustrating an example of a process performed by a storage according to the fourth embodiment. In the following, the process illustrated in FIG. 20 will be described step by step.

(S71) The status management unit 280 monitors the status of the storage apparatus 200*a*, and periodically updates the overall status stored in the storage unit 270. The update interval is, for example, 30 seconds.

(S72) The status management unit 280 detects a communication error in the communication with the management server 100*a* via the network 10. For example, the status management unit 280 may detect an operation error in the driver of the network adapter 214 or the like as a communication error.

(S73) The status management unit 280 updates the overall status of the storage apparatus 200*a* to "Error".

(S74) The status management unit 280 detects recovery from the communication error. For example, the storage apparatus 200*a* restarts software related to the communication error of the driver of the network adapter 214 or the like, thereby clears the error. Note that even after clearing the communication error, the status management unit 280 maintains the overall status of the storage apparatus 200*a* as "Error" in order to report to the management server 100*a*.

(S75) The status management unit 280 returns the overall status in response to a status request from the management server 100*a*. For example, the status management unit 280 returns the overall status "Error" to the management server 100*a*.

(S76) The apparatus information providing unit 260 determines whether an acquisition request for apparatus information is received from the management server 100*a*. If an acquisition request for apparatus information is received, the process proceeds to step S77. If an acquisition request for apparatus information is not received, the process ends.

(S77) The apparatus information providing unit 260 collects apparatus information in response to the acquisition request. More specifically, the apparatus information providing unit 260 collects component information of all the components managed by the management server 100*a* among the plurality of components of the storage apparatus 200*a*. The apparatus information providing unit 260 may acquire component information of those components by, for example, querying those components for component information. Alternatively, the apparatus information providing unit 260 may collect apparatus information in advance (for example, at predetermined intervals) into the storage unit 270, for example. In this case, the apparatus information providing unit 260 may read the apparatus information from the storage unit 270, in response to an acquisition request from the management server 100*a*.

(S78) The apparatus information providing unit 260 returns the apparatus information collected in step S77 to the management server 100*a*.

In the manner described above, the management server 100*a* checks the overall status of the storage apparatus 200*a* by polling. Then, upon detection of a state change of the storage apparatus 200a, the management server 100a autonomously accesses the components, and updates the management tables 111a, 111b, 111c, and so on. Thus, as in the case of the third embodiment, it is possible to improve the accuracy of the information registered in the management tables 111a, 111b, 111c, and so on.

(e) Fifth Embodiment

Hereinafter, a fifth embodiment will be described. The following mainly describes the differences from the second, third, and fourth embodiments, and features common thereto will not be described herein.

The fifth embodiment illustrates an example where the functions described in the second, third, and fourth embodiments are combined to perform operational management of the information processing system. The information processing system of the fifth embodiment includes a management server 100b, in place of the management server 100 of the second embodiment. The information processing system of the fifth embodiment includes a storage apparatus 200b, in place of the storage apparatus 200 of the second embodiment. The management server 100b may be implemented with the same hardware as that of the management server 100. The hardware elements of the management server 100b are denoted by the same names and reference numerals as those of the management server 100. The storage apparatus 200b may be implemented with the same hardware as that of the storage apparatus 200. The hardware elements of the storage apparatus 200b are denoted by the same names and reference numerals as those of the storage apparatus 200.

Figure 21:
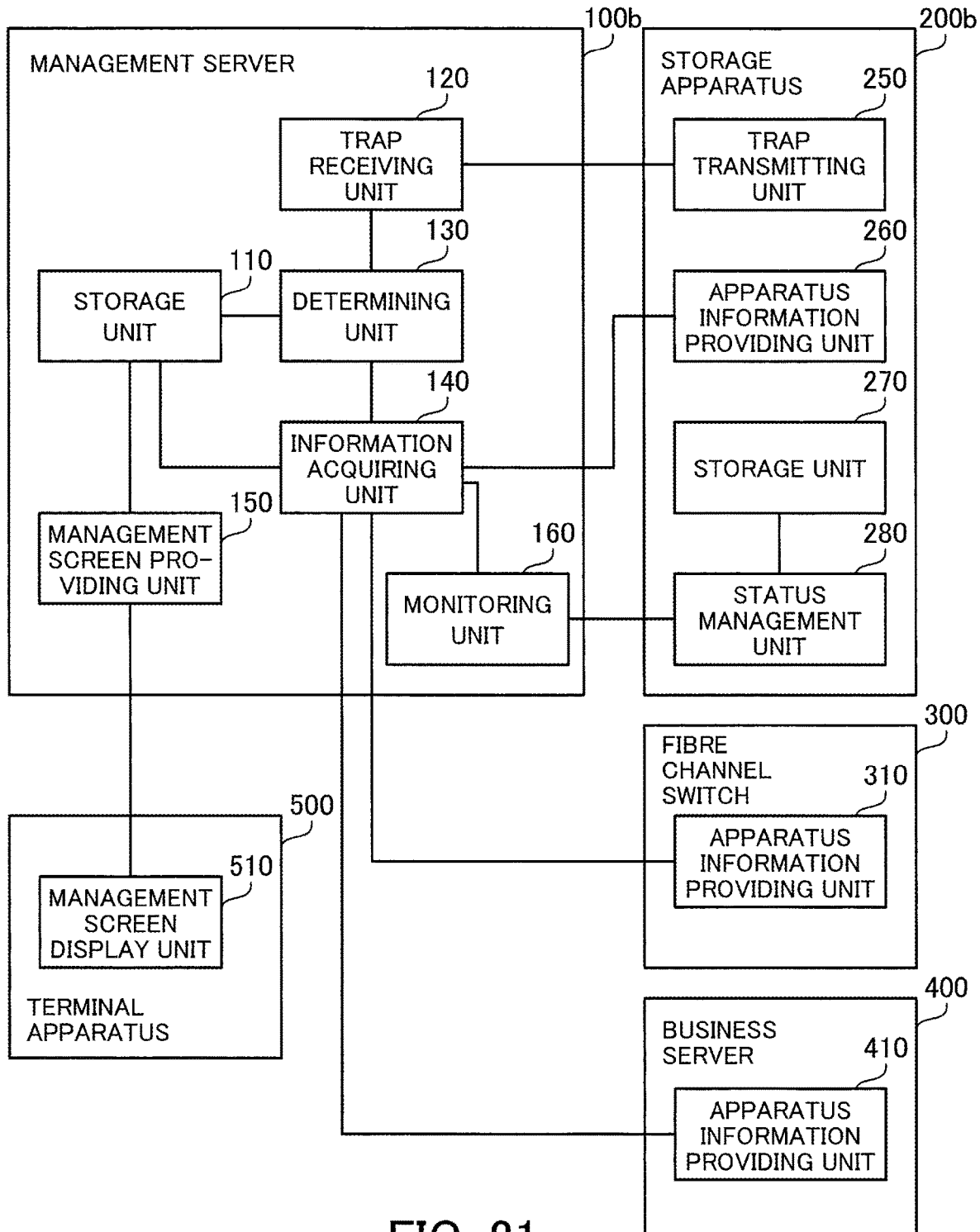
FIG. 21 illustrates an example of functions according to a fifth embodiment.

FIG. 21 illustrates an example of functions according to the fifth embodiment. The management server 100 includes a storage unit 110, a trap receiving unit 120, a determining unit 130, an information acquiring unit 140, a management screen providing unit 150, and a monitoring unit 160. The storage unit 110, the trap receiving unit 120, the determining unit 130, the information acquiring unit 140, and the management screen providing unit 150 correspond to the functions of the management server 100 of the same names. The monitoring unit 160 corresponds to the function of the management server 100a of the same name.

The storage apparatus 200b includes a trap transmitting unit 250, an apparatus information providing unit 260, a storage unit 270, and a status management unit 280. The trap transmitting unit 250 and the apparatus information providing unit 260 correspond to the functions of the storage apparatus 200 of the same names. The storage unit 270 and the status management unit 280 correspond to the functions of the storage apparatus 200a of the same names.

The functions of the Fibre Channel switch 300, the business server 400, and the terminal apparatus 500 are the same as those of the second embodiment, and will not be described herein.

The management server 100b may monitor a state change of the storage apparatus 200b, using both SNMP traps and polling. For example, in both the case where a state change of the storage apparatus 200b is detected via an SNMP trap and the case where a state change of the storage apparatus 200b is detected by polling, the management server 100b acquires apparatus information of each apparatus. For example, as for the event for which an SNMP traps is not issued by the storage apparatus 200b, the management server 100b may be able to detect a state change of the storage apparatus 200b corresponding to that event by performing polling. Further, as for the event that causes a state change of the storage apparatus 200b undetectable by polling, the management server 100b may be able to detect a state change of the storage apparatus 200b corresponding to that event upon via an SNMP trap. That is, the management server 100b is more likely to appropriately detect a state change of the storage apparatus 200b by monitoring the storage apparatus 200b using SNMP traps and polling in combination. Thus, since the management server 100b is able to more appropriately detect a state change, acquisition of apparatus information in response to a state change is performed at more appropriate time. Accordingly, it is possible to further improve the accuracy of component monitoring by the management server 100b.

Note that information processing in the first embodiment may be implemented by causing the processing unit 1b to execute a program. Further, the information processing in each of the second to fifth embodiments may be implemented by causing the processor 101 to execute a program. The program may be recorded in the computer-readable storage medium 13.

The program may be stored in the storage medium 13 and distributed, for example. Further, the program may be stored in another computer and distributed via a network. The computer may store (install) the program stored in the storage medium 13 or the program received from the other computer in its storage device such as the RAM 102, the HDD 103, and so on, and may read and execute the program from the storage device.

According to one aspect, it is possible to improve the accuracy of management information.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A management apparatus comprising:
a memory configured to store management information indicating statuses of a plurality of components, the plurality of components including a first component included in a first information processing apparatus and a second component included in a second information processing apparatus; and
a processor configured to perform a procedure including:
upon receiving a Simple Network Management Protocol (SNMP) trap indicating a state change of the first information processing apparatus, determining whether to query for component information indicating current statuses of query target components in response to the SNMP trap, the SNMP trap including a trap type specific to a vendor of the first information processing apparatus,
when a determination is made to query for the component information, detecting the state change affects the second information apparatus based on the trap type and selecting the first component and the second component as the query target components from the plurality of components, the selecting includes selecting the query target components related to the state change, based on content of the state change indicated by the SNMP trap, acquiring the component information of the selected query target components from the first information processing apparatus and the second information processing apparatus, and updating the management information stored in the memory, based on the component information.

2. The management apparatus according to claim 1, wherein the determining includes, upon receiving a notification indicating a value of a counter held in the first information processing apparatus or an overall status of the first information processing apparatus, determining whether to query for the component information, based on the value of the counter or a change in the overall status.

3. The management apparatus according to claim 1, wherein:

the first information processing apparatus is a storage apparatus including a plurality of types of storage devices; and the determining includes, when the SNMP trap indicating completion of a process of migrating data from a first type storage device to a second type storage device is received from the storage apparatus, determining to query for the component information.

4. An information processing system comprising:

a plurality of information processing apparatuses each including components; and a management apparatus including a memory configured to store management information indicating statuses of a plurality of components including the components of each of the plurality of information processing apparatuses, the plurality of components including a first component included in a first information processing apparatus and a second component included in a second information processing apparatus, and a processor configured to perform a procedure including upon receiving a Simple Network Management Protocol (SNMP) trap indicating a state change of the first information processing apparatus, determining whether to query for component information indicating current statuses of query target components in response to the SNMP trap, the SNMP trap including a trap type specific to a vendor of the first information processing apparatus, when a determination is made to query for the component information, detecting the state change affects the second information apparatus based on the trap type and selecting the first component and the second component as the query target components from the plurality of components, the selecting includes selecting the query target components related to the state change, based on content of the state change indicated by the SNMP trap, acquiring the component information of the selected query target components from the first information processing apparatus and the second information processing apparatus, and updating the management information stored in the memory, based on the component information.

5. A non-transitory computer-readable storage medium storing a computer program, the computer program causing a computer to perform a procedure comprising:

upon receiving a Simple Network Management Protocol (SNMP) trap indicating a state change of a first information processing apparatus, determining whether to query for component information indicating current statuses of query target components in response to the SNMP trap, the SNMP trap including a trap type specific to a vendor of the first information processing apparatus;

when a determination is made to query for the component information, detecting the state change affects a second information apparatus based on the trap type and selecting a first component included in the first information apparatus and a second component included in the second information apparatus as the query target components from a plurality of components, the selecting includes selecting the query target components related to the state change, based on content of the state change indicated by the SNMP trap;

acquiring the component information of the selected query target components from the first information processing apparatus and the second information processing apparatus; and updating management information indicating statuses of the components, based on the component information.

* * * * *